United States Patent
Hien et al.

(10) Patent No.: US 6,945,461 B1
(45) Date of Patent: Sep. 20, 2005

(54) COMPACT MULTIFUNCTION CARD FOR ELECTRONIC DEVICES

(75) Inventors: Tg Hien, San Jose, CA (US); Liang-Hien Lin, Newark, CA (US); Charlie Payne, San Jose, CA (US); Steve Parker, Centerville, UT (US); William G. Becker, Danville, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/823,449

(22) Filed: Mar. 30, 2001

(51) Int. Cl.[7] .............................................. G06K 7/00
(52) U.S. Cl. ..................................... 235/451; 235/441
(58) Field of Search ............................... 235/451, 441, 235/492, 444, 486, 487

(56) References Cited

U.S. PATENT DOCUMENTS

| | | | | |
|---|---|---|---|---|
| 5,612,532 A | * | 3/1997 | Iwasaki ..................... 235/492 |
| 5,887,145 A | * | 3/1999 | Harari et al. ............... 395/282 |
| 6,323,775 B1 | * | 11/2001 | Hansson ..................... 235/384 |
| 6,377,218 B1 | * | 4/2002 | Nelson et al. ............... 343/702 |
| 6,394,341 B1 | * | 5/2002 | Makipaa ...................... 235/379 |
| 6,417,913 B2 | * | 7/2002 | Tanaka ......................... 355/39 |
| 6,418,346 B1 | * | 7/2002 | Nelson et al. ................ 607/59 |
| 6,509,876 B1 | * | 1/2003 | Jones et al. ................. 343/702 |
| 6,575,361 B1 | * | 6/2003 | Graves et al. ............... 235/380 |

* cited by examiner

*Primary Examiner*—Daniel St Cyr

(57) ABSTRACT

An apparatus and method for enhancement of the functionality of electronic devices. In one embodiment, the present invention is comprised of an intermediary apparatus. The intermediary apparatus is adapted to be communicatively coupled with an electronic device. In the present embodiment, the apparatus is further comprised of a first module. The first module is comprised of a first electrical connector which is adapted to enable communication between the first module and the electronic device. The first module is further comprised of a second electrical connector adapted to enable communication between the first module and a second module. The first module is further comprised of an opening that is adapted to receive a second module. Additionally, the apparatus is further comprised of a controller adapted to control the communication between the first module and a second module, provided a second module is inserted into the first module.

19 Claims, 35 Drawing Sheets

COMPACT MULTIFUNCTION CARD FOR ELECTRONIC DEVICES

FIELD OF THE INVENTION

The present invention relates to compact memory devices such as, e.g., secure digital cards and multimedia cards, utilized in electronic devices. More particularly, the present invention relates to an apparatus for combining compact memory devices with wireless communication functionality.

BACKGROUND OF THE INVENTION

Continued advancement in technology has enabled further miniaturization of the components required to build computer systems. This continued miniaturization has, in part, fueled the development of many of the new electronic products that are now available. A partial list of some of those newly developed products include palmtop computer systems, personal digital assistants or PDAs, electronic address books, electronic day planners, digital cameras, electronic picture frames, digital music players, digital telephones, and the like.

To support the miniaturization of the components and to remain within the physical properties of the newly developed electronic products, some of the components and functionalities equated with full-sized electronic devices have been reduced.

One of the components whose functionality has been reduced is the component used for communication between electronic devices. In one example, the component may have been a modem, either wired or wireless, such as one that is inserted in an expansion slot on the motherboard of a desktop or laptop computer system, and is therefore much too large for the diminutive size of the newer categories of electronic devices. In another example, the modem may have been a wired or wireless modem adapted as a PCMCIA (personal computer memory card international association) modem that requires an insertion slot that might be larger than the device into which it would have been placed. In yet another example, the component may have been an RF (radio frequency) wireless means of communication that because of, for example, a required antenna, is not a practical solution for the electronic device in which it would be placed.

To facilitate communication between such devices as those listed above, new classifications and categories of wireless communication have been developed. One such category that has been developed is Bluetooth technology. Bluetooth technology allows for the replacement of the many proprietary cables that connect one device to another with one universal short-range radio link. Additionally, Bluetooth technology requires substantially less power during operation, and, therefore, is well suited for implementation in the above mentioned diminutive electronic devices. For instance, Bluetooth radio technology built into both the cellular telephone and the laptop would replace the cumbersome cable used today to connect a laptop to a cellular telephone. Printers, personal digital assistants (PDAs), portable computer systems, electronic picture frames, desktop computer systems, digital cameras, fax machines, keyboards, joysticks, and virtually any other digital device can be part of the Bluetooth system.

Another component whose functionality has been reduced is the hard drive. The hard drive is most commonly associated with the storing of data within an electronic system. A full-sized hard drive, which by today's standards has a physical dimension of approximately 3¼ inches wide by 5¼ inches long by 2 inches thick, is no longer a viable answer to the storage of data within an electronic device which has physical dimensions that are, in many instances, smaller in size than the hard drive itself While the process of component miniaturization has also been applied to the devices utilized for data storage, and has, in part, created smaller and smaller hard drives, which may or may not fit within an electronic device, other means of data storage have also been developed. As such, new categories of media storage devices for electronic devices and computer systems have been created. One of the newer categories of media storage devices developed has been the compact memory device. The compact memory device is commonly referred to as an SD (secure digital card), an MMC (multimedia card), a memory stick, and the like.

The compact memory device (SD, MMC, or memory stick) is designed to be inserted into an electronic device through an opening in an accessible slot. It is adapted to store data, e.g., text based information, applications, and/or graphics. It is also well suited to store music files such as the new MP3 files. These new compact memory cards provide a means to add functionality and data storage capabilities to electronic devices while continuing to conform to the size of the electronic device. The advantage of having an electronic device configured with an accessible slot is so as to be able to use the compact memory devices to provide, for the electronic device, an almost endless array of different information and applications.

While the development of the compact memory device has overcome, in part, some of the above mentioned shortcomings, they are not without their own drawbacks. One such drawback is that, while the compact memory device has remained complimentary to the diminutive size of the newer electronic devices, it is the size of the memory device that is a drawback. Because the size of the memory device, a commensurately small accessible slot is needed in the electronic device, so much so that it may be difficult for some users to insert the compact memory device into the slot of the electronic device. Further, because of the diminutive size of the memory device, the size of the electrical connectors has also been reduced. As such, the connectors are more prone to incidental damage due to improper handling or being dropped. In addition, unless the memory device is correctly inserted into the accessible slot of the electronic device, the act of improperly inserting the compact memory device might damage the connector disposed within the electrical device and/or damage the connector of the compact memory device such that the electronic device and/or the compact memory device may become inoperable.

Additionally, once the compact memory device is fully inserted into the accessible slot, the compact memory device is commonly disposed such that a user must awkwardly attempt to remove the compact memory device, either by grabbing some small portion of the memory device or by using a fingernail or other type of edged object such as, e.g., a knife, to attempt to snag or pick the memory device for removal. To overcome this additional drawback, the manufacturer of the electronic device is required to provide a ejecting apparatus that would provide a mechanism to make the removal of the compact memory device easier for the user. Because some sort of release mechanism must be provided and that the mechanism would occupy a portion of the useable real estate within the electronic device, it is conceivable, that, as a compromise to the lost real estate of the electronic device, less functionality would be included in the electronic device. Further, the cost of mechanism would be passed on to the consumer, so as to increase the overall cost of manufacturing the electronic device and therefore increasing the purchase price of the electronic device.

Additionally, with the development of the compact memory device, numerous companies have developed their own product types. It should be noted that this is also another drawback because those different companies have created different compact memory devices that have different physical dimensions and different storage capacities. For example, one company's compact memory device is approximately the size of a postage stamp, having the dimensions of about 32 mm long by 24 mm wide by 2.4 mm thick. However, another company's compact memory device is the approximate size of a stick of chewing gum, having the dimensions of about 75 mm long by 20 mm wide by 2 mm thick. There are also other examples of compact memory devices manufactured by other companies that are of dimensions different from those listed above. As such, one type of compact memory device will rarely fit into a slot designed for another compact memory device.

Additionally, each compact memory device may have a varied amount of connecting pins and different pin configurations, such that, for example, the function of the number nine pin of one compact memory device may not be analogous to the function of the number nine pin of another compact memory device. In a further example, another compact memory device may have only seven connecting pins and not nine pins as the others mentioned previously. By virtue of the diminutive size of the electronic devices, providing an individual accessible slot for each available size and type of compact memory device and disposing those slots within an electronic device is not feasible.

Additionally, because most of the new electronic devices are equipped with one accessible slot, the user may use a compact memory device or a compact communication device. Unfortunately, because of this singularity of accessible slots, either a communication device or a compact memory device may be implemented at any given time. As an example, a user may have taken a set of pictures with a digital camera and had saved those photos using the storage capabilities of a compact memory device. Now the user wishes to upload those pictures wirelessly to a computer system. As such, the user removes the compact memory device containing the pictures and inserts into the slot a wireless communication device. The camera can utilize the wireless system to communicate with other devices so equipped, but because the compact memory device, which contains the pictures, is no longer in the slot, the wireless transference of those pictures to the computer is not possible. The transferring of the pictures would need to be accomplished through a wired connection, such as a serial interface, which would defeat the purpose of having wireless communication enablement.

Therefore, a user, when deciding upon which electronic device they will acquire, must also decide upon which type and size of compact memory card that is associated with the device they may be acquiring. For example, one type of electronic device may have certain functionalities and utilize a postage sized compact memory card, while another similar electronic device may have additional functionalities and utilize a chewing gum sized compact memory card. The user must therefore not only weigh the differences in functionalities between the electronic devices, but also weigh the availability of different functions and storage capacities that are available with the type of compact memory card utilized by that particular device.

Thus exists a need for an apparatus and method that is able to utilize compact memory devices. Additionally, a need exists for an apparatus and method which meets the above listed need and which provides for wireless communication. Further, a need exists for an apparatus and method that fills the above listed needs and that can provide enablement for both the wireless communication and the compact memory device while requiring a single externally accessible slot into which the communication device and the compact memory device may be laced.

SUMMARY OF THE INVENTION

Accordingly, the present invention provides an apparatus and method for providing improved features and enhanced functionality to nearly any electronic device. The present invention further provides an apparatus and method which achieves the above listed accomplishment and which provides advanced user interoperability by incorporating compact memory devices and compact wireless communication devices into a single accessible slot. The present invention further provides an apparatus and method which achieves the above listed accomplishments in an simple and seamless manner to the user of the electronic device.

The present invention provides an apparatus and method for enhancement of the functionality of electronic devices. In one embodiment, the present invention is comprised of an intermediary apparatus. The intermediary apparatus is adapted to be communicatively coupled with an electronic device. In the present embodiment, the apparatus is further comprised of a first module. The first module is comprised of an opening adapted to receive a second module. The first module is comprised of a first electrical connector which is adapted to enable communication between the first module and the electronic device. The first module is further comprised of a second electrical connector adapted to enable communication between the first module and the second module, provided the second module is inserted into the first module. Additionally, the apparatus is further comprised of a controller. The controller is adapted to control the communication between the first module and the second module, provided the second module is inserted into the first module.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
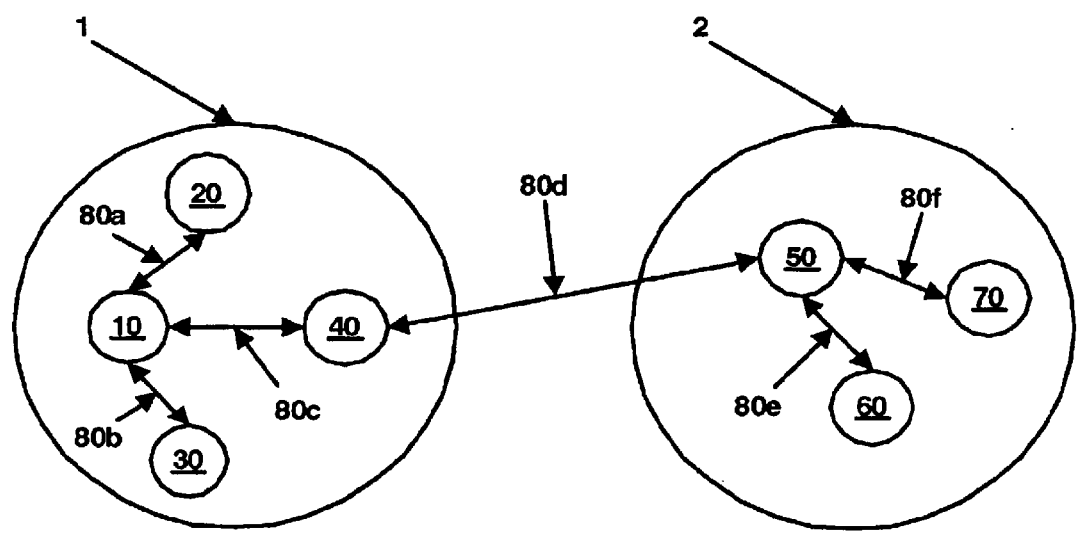
FIG. 1 illustrates one embodiment of a network of devices coupled using wireless connections in accordance with the present invention.

A compact intermediary apparatus is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention Notation and Nomenclature Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "indicating" or "indexing" or "receiving" or "performing" or "initiating" or "sending" or "implementing" or "disabling" or "enabling" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a portable electronic device, e.g., a portable computer system such as a personal digital assistant, a digital camera, a digital picture frame, or a digital music player. However, it is appreciated that the present invention can be used with nearly all other types of electronic devices, portable or not, that have the capability to access compact memory cards and which have the capability to communicate with other electronic devices, other computer systems and/or some type of central device or central site, including but not limited to palmtop computer systems.

Exemplary Bluetooth Platform

FIG. 1 illustrates the topology of a network of devices coupled using wireless connections in accordance with one embodiment of the present invention. In the parlance of Bluetooth, a collection of devices connected in a Bluetooth system are referred to as a "piconet" or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Accordingly, devices 10, 20, 30 and 40 are coupled in piconet 1 using wireless connections 80a–c. Similarly, devices 50, 60 and 70 are coupled in piconet 2 using wireless connections 80e–f. Piconet 1 and piconet 2 are coupled using wireless connection 80d. Devices 10–70 can be printers, desktop computer systems, laptop computer systems, cell phones, fax machines, keyboards, joysticks, and, in one embodiment of the present invention; personal digital assistants (PDAs), digital cameras, digital picture frames, MP3 players, or virtually any other digital device. In the present embodiment, devices 10–70 are Bluetooth devices; that is, they are equipped with a Bluetooth radio transceiver, or they are adapted to communicate with Bluetooth devices ("Bluetooth-enabled"). That is, the Bluetooth radio transceiver may be integrated into a device, or it may be coupled to a device.

Figure 2:
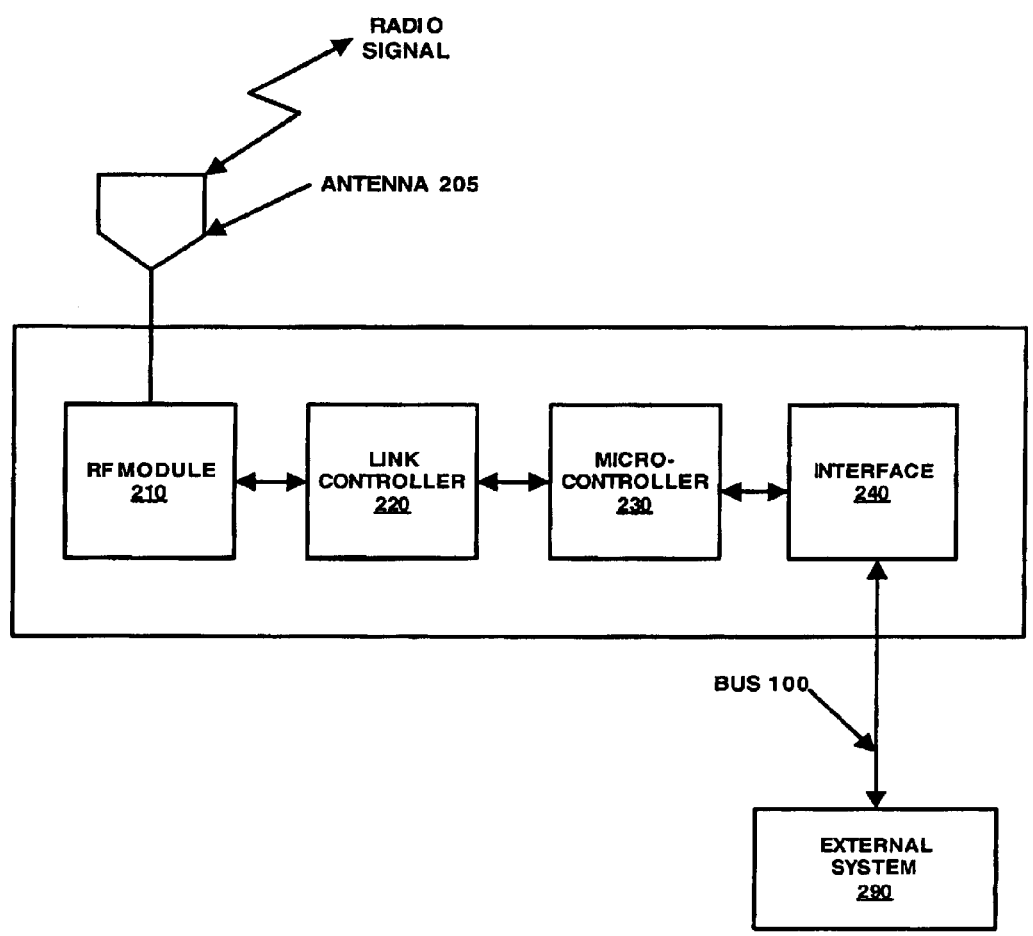
FIG. 2 is a block diagram showing one embodiment of a wireless transceiver in accordance with the present invention.

FIG. 2 is a block diagram of one embodiment of a transceiver 108B in accordance with the present invention. In a preferred embodiment (the "Bluetooth embodiment"), transceiver 108B is a Bluetooth device comprising a digital component (e.g., a Bluetooth controller) and an analog component (e.g., a Bluetooth radio).

In the present embodiment, transceiver 108B comprises an antenna 205 for receiving or transmitting radio signals, a radio frequency (RF) module 210, a link controller 220, a microcontroller (or central processing unit) 230, and an external interface 240. In one embodiment of the present invention, transceiver 10B8 is coupled by a system bus 100 to an external device 290 (e.g., a host device such as a computer system or similar intelligent electronic device, a PDA, a printer, a fax machine, a digital camera, an electronic picture frame, etc.). However, it is appreciated that in another embodiment, transceiver 108 may be integrated into external device 290.

In the Bluetooth embodiment, RF module 210 is a Bluetooth radio. The Bluetooth radio can provide: a bridge to existing data networks, a peripheral interface, and a mechanism to form piconets of connected devices away from fixed network infrastructures (see FIG. 1).

Bluetooth radios operate in the ISM (Industrial, Scientific, Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE (Institute of Electronic and Electrical Engineering) 802.11 standard. The frequency hopping scheme is combined with fast ARQ (Automatic Repeat Request), cyclic redundancy check (CRC) and Forward Error Correction (FEC) for data.

In the present embodiment, link controller 220 is a hardware digital signal processor for performing baseband processing as well as other functions such as Quality-of-Service, asynchronous transfers, synchronous transfers, audio coding, and encryption.

In one embodiment, microcontroller 230 is an application specific integrated circuit (ASIC). In the Bluetooth embodiment, microcontroller 230 is a separate central processing unit (CPU) core for managing transceiver 108 and for handling some inquiries and requests without having to involve the host device. In the Bluetooth embodiment, microcontroller 230 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup. The LMP also can be used to place transceiver 108B in "sniff" mode, "hold" mode, "park" mode or "standby" mode.

In the present embodiment, before any connections between Bluetooth devices are created, all devices are in standby mode. In this mode, an unconnected unit "listens" for messages at a regular rate (e.g., every 1.28 seconds) on a set of hop frequencies defined for that unit. The hold mode is a power saving mode that can be used for connected units if no data need to be transmitted. The sniff and park modes are also low power modes. In the sniff mode, a device listens to the piconet at a reduced rate (relative to the regular rate), thus reducing its duty cycle. The sniff interval is programmable and depends on the application. In the park mode, a device is still synchronized to the piconet but does not participate in the traffic.

A connection between devices is made by a "page" message if the address is already known, or by an "inquiry" message followed by a subsequent page message if the address is unknown.

With reference still to FIG. 2, in the present embodiment, interface 240 is for coupling transceiver 108B to external device 290 in a suitable format (e.g., USB, PCMCIA, PCI, CardBus, PC Card, etc.). In the present embodiment, interface 240 runs software that allows transceiver 108B to interface with the operating system of external device 290.

Figure 3:
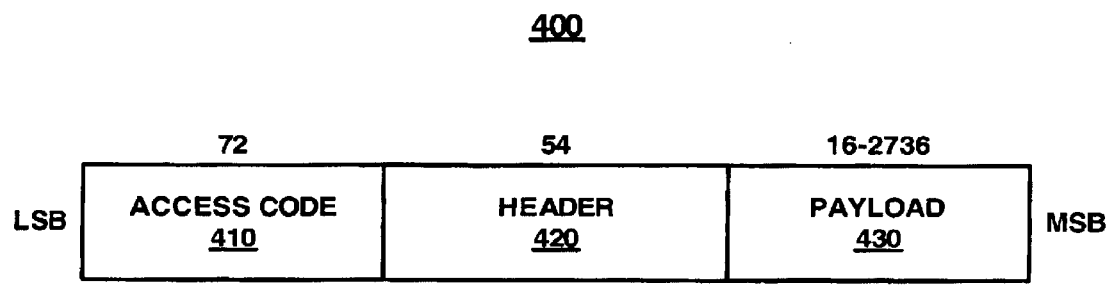
FIG. 3 illustrates a data packet format in accordance with one embodiment of the present invention.

FIG. 3 illustrates a format for a data packet 400 in accordance with one embodiment of the present invention. In the present embodiment, packet 400 consists of three fields: a 72-bit access code 410, a 54-bit header 420, and a payload 430 of variable length (2–342 bytes, or 16–2736 bits). Packet 400 may consist of the access code only, a shortened version of the access code, the access code and the header, or the access code, header and payload.

Access code 410 is used for synchronization, offset compensation and identification. Access code 410 identifies all packets exchanged on the channel of a piconet (e.g., piconet 1 and 2 of FIG. 1). All packets rent in the same piconet are preceded by the same channel access code.

Payload 430 carries user information and control information. In a data packet, payload 430 also contains data. A cyclic redundancy check (CRC) is added to each payload that contains data to verify the success of the reception of the data packet.

Figure 4:
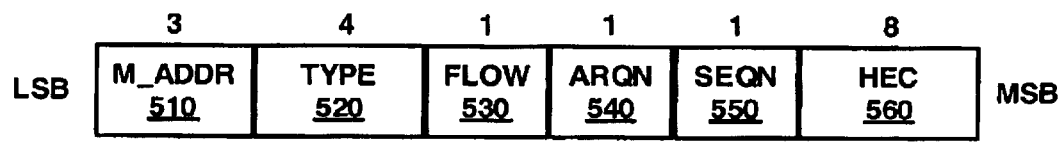
FIG. 4 illustrates a header format in a data packet in accordance with one embodiment of the present invention.

FIG. 4 illustrates a format of header 420 in a data packet 400 (FIG. 3) in accordance with one embodiment of the present invention. Header 420 contains lower-level link control information. In the present embodiment, header 420 consists of six (6) fields: a 3-bit sub address (M_ADDR 510), a 4-bit packet type (TYPE 520), a 1-bit flow control bit (FLOW 530), a 1-bit acknowledge indication (ARQN 540), a 1-bit sequence number (SEQN 550), and an 8-bit header error check (HEC 560). In this embodiment, the total header information consists of 18 bits, but it is protected with a ⅓ forward-error correction (EEC) coding resulting in a 54-bit header length.

In the present embodiment, M_ADDR (Medium Access Control Address) 510 represents a Medium Access Control (MAC) address and is used to distinguish between the participant devices of a piconet. Typically, several slave devices ("slaves") are connected to a single master device ("masters"). To identify each slave separately, each slave is assigned a temporary MAC address for the duration of the connection. Packets exchanged between the master and a slave all carry the M_ADDR of this slave. The all-zero address is reserved for broadcasting purposes.

In the Bluetooth embodiment, a link type is used to define what type of packets can be used on a particular link. The Bluetooth technology supports two link types: Synchronous Connection Oriented (SCO) used primarily for voice, and Asynchronous Correctionless (ACL) used primarily for data. In the present embodiment, sixteen different types of packets can be distinguished; The 4-bit TYPE 520 code specifies which packet type is used. The interpretation of the TYPE 520 code depends on the physical link type associated with the packet. First, it is determined whether the packet is a SCO link packet or an ACL link packet. Then, it is determined which of the SCO packet types or ACL packet types is being dealt with. The TYPE 520 code also reveals how many slots the current packet will occupy.

In the present embodiment, the FLOW 530 bit is used for flow control over the ACL link When the receiver buffer for the ACL connection in the receiving device is full and is not emptied by the link support unit, a STOP indication (FLOW=0) is returned to stop the transmission of data temporarily. In this embodiment, the STOP signal only concerns ACL packets, and so packets including only link control (POLL and NULL packets) or SCO packets can still be received. When the receive buffer is empty, a GO indication (FLOW=1) is returned. When no packet is received or the received header is in error, a GO is assumed implicitly.

In the present embodiment of the present invention, the ARQN 540 bit is an acknowledge field to inform the transmitting device whether the reception of the data packet in the preceding slot was successful (ARQN=1) or unsuccessful (ARQN=0). When no valid ARQN field is received, ARQN=0 is assumed implicitly. ARQN=0 is the default value. ARQN 540 is piggy-backed in the return data packet (e.g., an acknowledge signal) sent to the transmitting device by the receiving device. The success of the reception is checked by the receiving device by means of the CRC which is added to each payload that contains data. In the present embodiment, an unnumbered ARQ scheme is used, which means that ARQN 540 relates to the packet just received.

In the present embodiment, SEQN (Sequential Numbering Scheme) 550 is a numbering field to distinguish new packets from retransmitted packets. The SEQN 550 bit is toggled by the transmitting device for each new packet transmission. A retransmitted packet keeps the same SEQN 550 bit. If two consecutive packets are received with the same SEQN 550 bit, the second packet is ignored by the receiving device.

In the present embodiment, each header has a header error check (HEC) 660 so that the receiving device can check the header integrity. If the HEC 560 does not check, the entire packet is disregarded by the receiving device.

Figure 5:
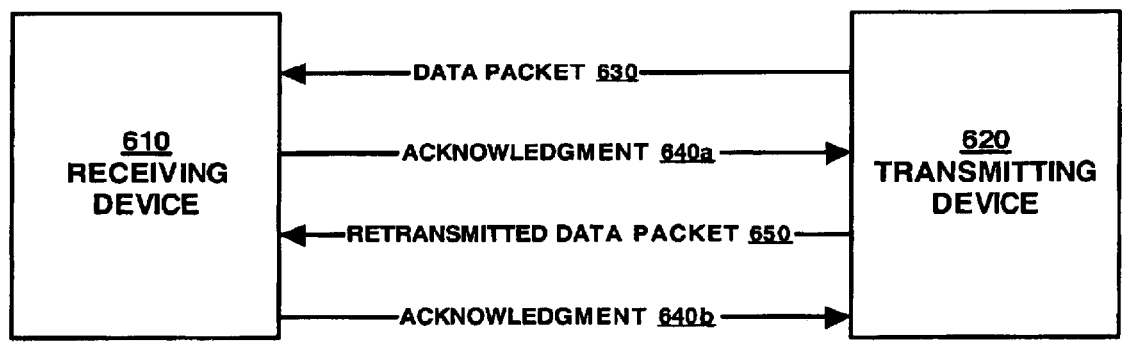
FIG. 5 diagrams a transfer of data packets between receiving and transmitting devices in accordance with one embodiment of the present invention.

FIG. 5 diagrams a transfer of data packets between receiving device 610 and transmitting device 620 in accordance with one embodiment of the present invention. In one embodiment, receiving device 610 and transmitting device 620 are Bluetooth devices or Bluetooth-enabled devices.

In the present embodiment, an unnumbered ARQ scheme is applied in which a data packet transmitted in one slot is directly acknowledged by the receiving device in the next slot. For a data transmission to be acknowledged (ARQN=1), both the HEC 560 and the CRC must check; otherwise a negative acknowledge NAK (ARQN=0) is returned (refer to FIG. 4).

Continuing with reference to FIG. 5 and with reference also to FIGS. 3 and 4, in the present embodiment, data packet 630 is received by receiving device 610. Data packet 630 has a data payload 430 including a CRC. In one embodiment, link controller 220 (FIG. 2) of receiving device 610 first checks the HEC 560 in data packet 630. If the HEC 560 checks, the payload CRC is checked. If the CRC checks as well, the ARQN 540 field in the return packet (e.g., acknowledgment 640a) is set to a binary 1 (ARQN=1). Otherwise the ARQN 540 field in acknowledgment 640a is set to binary zero (ARQN=0). When the HEC 560 and CRC check, the payload 430 is accepted, provided SEQN 550 in the packet header 420 differs from the SEQN 650 in the last successfully received packet (e.g., the data packet preceding data packet 630). Otherwise the payload 430 is discarded.

On reception of acknowledgment 640a, in one embodiment, link controller 220 (FIG. 2) of transmitting device 620 first checks the HEC of acknowledgment 640a. If the HEC checks, it reads the ARQN field in the header of acknowledgment 640a. If ARQN=1, the sender toggles SEQN 550 in the next data packet and transmits that data packet in the next transmit slot. If the HEC does not check or a NAK (ARQN=0) has been received, SEQN 550 is not toggled and the previous payload 430 is retransmitted (that is, data packet 630 is resent as retransmitted data packet 650). Upon receipt of retransmitted data packet 650 by receiving device 610, the HEC and CRC are checked, the SEQN bit is read, and acknowledgment 640b is sent. The contents of acknowledgment 640b are dependent on the HEC and CRC results, as described above. This scheme is repeated for each data packet until all data packets are successfully transmitted and received.

The ARQ scheme described above is carried out separately between the master and each slave. The master receives acknowledgment data of master-to-slave information directly in the slave-to-master slot following the master-to-slave slot. Acknowledgment data of slave-to-master information are received in the next master-to-slave slot in which the master addresses the slave.

Exemplary Networked Electronic Device

Figure 6A:
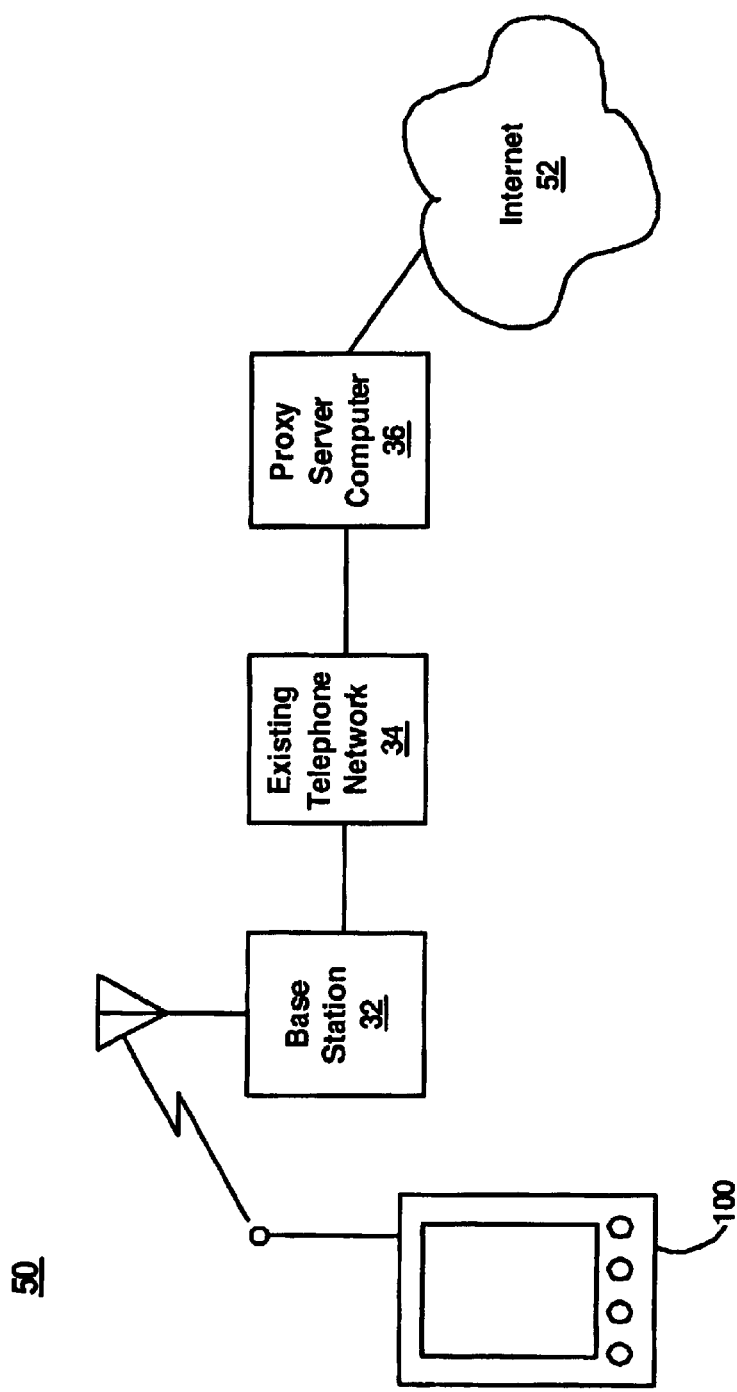
FIG. 6A is a block diagram of an exemplary network environment including an electronic device in accordance with one embodiment of the present invention.

FIG. 6A is a block diagram of an exemplary network environment 50 including an electronic device 100 in accordance with one embodiment of the present invention. Electronic device 100, shown as a palmtop computer in FIGS. 6A and 6B for purposes of network explanation, has, in one embodiment, the ability to transmit and receive data and information over a wireless communication interface (e.g., a radio interface). For purposes of the present application, the term electronic device is not intended to be limited solely to one type of electronic device or computer system. Instead, the term "electronic device" or "computer system" is intended to include nearly any electronic device or computer system which can be used to wirelessly communicate with a network. Such electronic devices include but are not limited to pagers and paging Systems, wireless and cellular telephones, electronic address books, personal digital assistants, laptop computers, handheld or palmtop computers, printers, digital cameras, electronic picture frames, MP3 players, and numerous other electronic devices which have the ability to communicate with a network. As such, for purposes of the present application, the terms "electronic device" and "computer system" will be considered synonymous and will be used interchangeably throughout the present application.

In the present embodiment, base station 32 is both a transmitter and receiver base station, which can be implemented by coupling it into an existing public telephone network 34. Implemented in this manner, base station 32 enables electronic device 100 to communicate with a proxy server computer system 36, which is coupled by wire to the existing public telephone network 34. Furthermore, proxy server computer system 36 is coupled to the Internet 52, thereby enabling electronic device 100 to communicate with the Internet 52. When communicating with a Web site over Internet 52, protocols such as CTP (Compact Transport Protocol) and CML (Compact Markup Language) can be used by electronic device 100 in the present embodiment.

It should be appreciated that within the present embodiment, one of the functions of proxy server 36 is to perform operations over the Internet 52 on behalf of electronic device 100. For example, proxy server 36 has a particular Internet address and acts as a proxy device for electronic device 100 over the Internet 52.

It should be further appreciated that other embodiments of a communications network, planned or envisioned, may be utilized in accordance with the present invention. For example, a wireless connection may be made from electronic device 100 directly to the Internet 52.

The data and information which are communicated between base station 32 and electronic device 100 are the same type of information and data that can conventionally be transferred and received over a public telephone wire network system. Additionally, in FIG. 6A, the existing telephone network could also be a packet-based network wireless data network utilized by some conventional portable computer systems. However, a wireless communication interface is utilized to communicate data and information between electronic device 100 and base station 32. It should be appreciated that one embodiment of a wireless communication system in accordance with the present invention is the Bluetooth wireless communication system. Furthermore, nearly any wireless network can support the functionality to be disclosed herein.

Figure 6B:
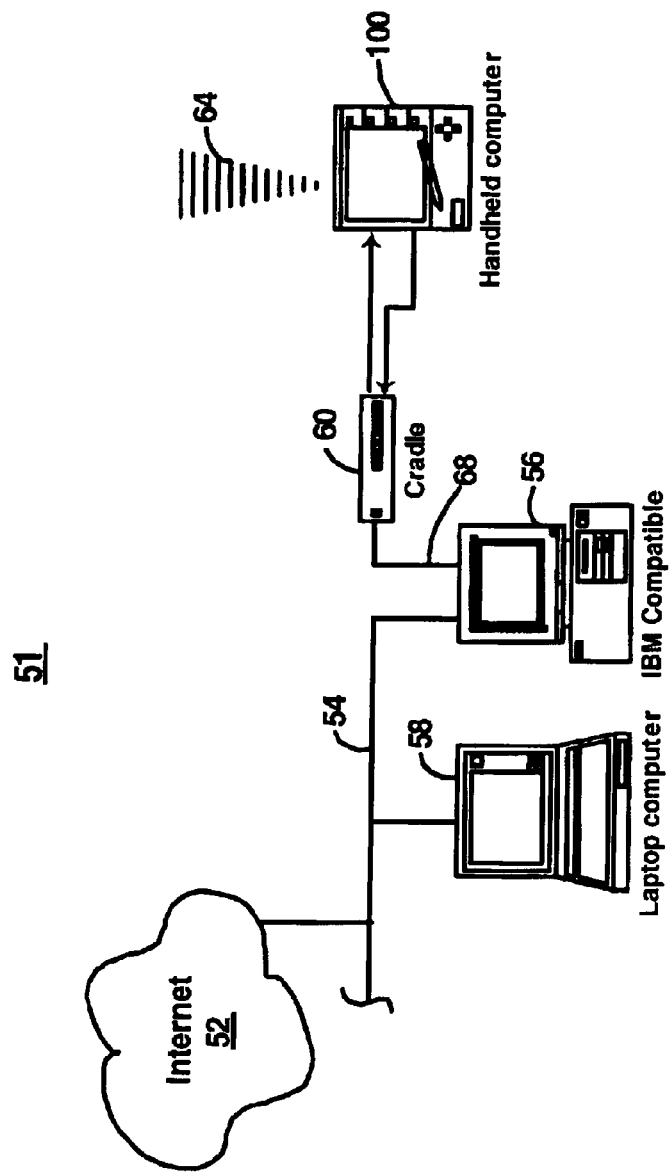
FIG. 6B is a block diagram of an electronic device connected to other electronic devices and the Internet via a cradle device in accordance with one embodiment of the present invention.

FIG. 6B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100 ("handheld computer") of the present invention. Cradle 60 provides an electrical and mechanical communication interface between bus 54 (and anything coupled to bus 54) and the electronic device 100 for two-way communications. It is appreciated that, in accordance with the present invention, electronic device 100 may instead be coupled to host computer systems 56 and 58 via a wireless (radio) connection. Electronic device 100 also contains a wireless infrared communication mechanism 64 for sending and receiving information from other devices. Additionally, in FIG. 6B, the existing telephone network could also be a packet-based network utilized by some conventional portable computer systems.

With reference to both FIGS. 6A and 6B, it is appreciated that electronic device 100 can be used in a network environment combining elements of networks 50 and 51.

DESCRIPTION OF THE PRESENT INVENTION

Figure 7A:
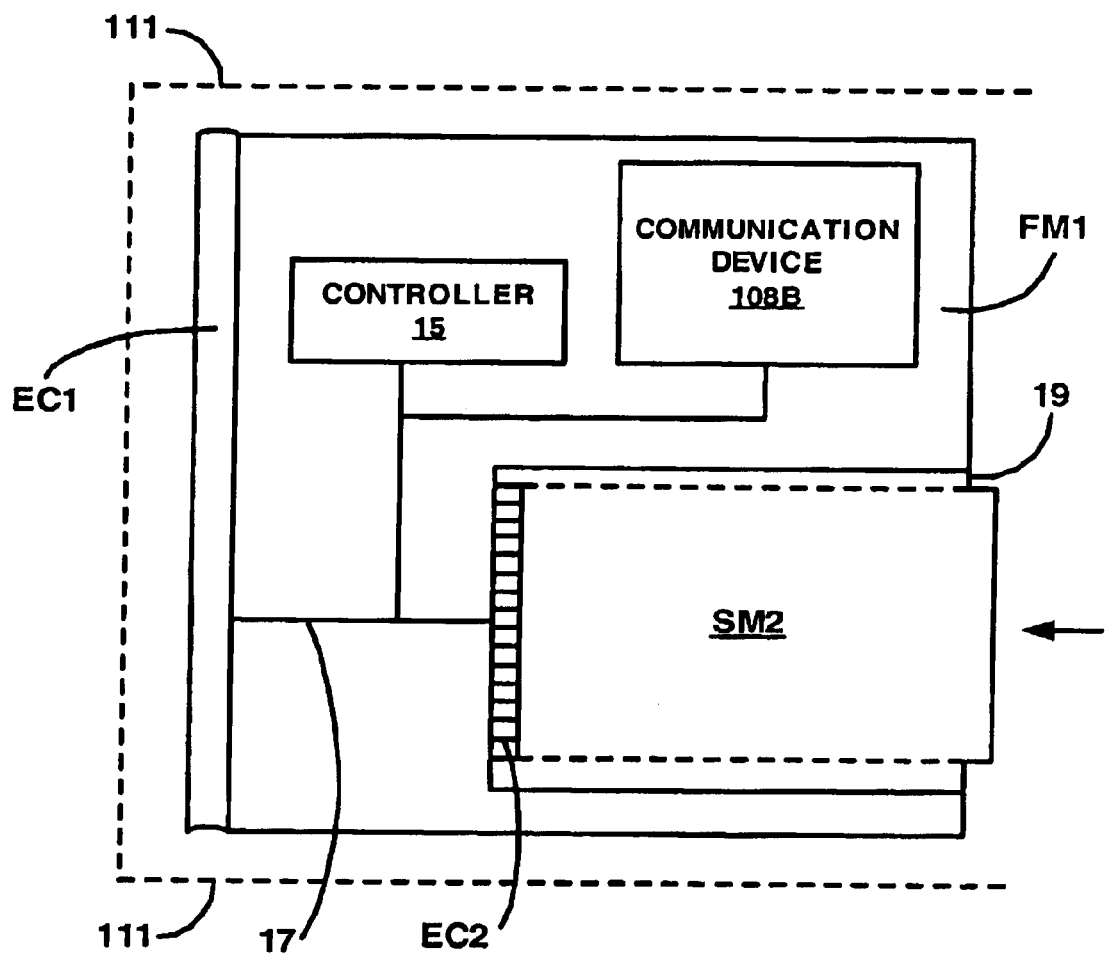
FIG. 7A is a block diagram showing one embodiment of an intermediary apparatus, in accordance with the present invention.

FIG. 7A is a block diagram of intermediary apparatus 2001, in one embodiment of the present invention. Intermediary apparatus 2001 is shown to include communication bus 17 adapted for communicating information and disposed within FM (first module) 1. In one embodiment of the present invention, FM1 is a compact flash device. FM1 is adapted to be inserted into an externally accessible slot disposed on electronic device 100, as indicated by dotted line 111. EC (electrical connector) 1, coupled with bus 17, is adapted to enable communication between the present invention and electronic device 100. EC1 is coupled with FM (first module) 1, and in the present embodiment, EC1 is a 50 pin electrical connector, but could also alternatively be a 68 pin electrical connector. In another embodiment of the present invention, EC1 is a seven or nine pin electrical connector, or any of a number of well-known communication standards and protocols, e.g., SCSI (small computer system interface), Firewire (IEEE 1394), parallel, etc.

Still referring to FIG. 7A, shown is EC (electrical connector) 2 disposed within FM1 and coupled with bus 17. EC2 is adapted to enable communication between FM1 and SM2, in one embodiment of the present invention. Controller 15 is also shown. Controller 15, coupled with bus 17 and also to FM (first module) 1, is adapted to control the communication between FM (first module) 1 and SM (second module) 2 via EC2. Device 108B is shown as coupled with bus 17 and disposed within FM1. In this embodiment, device 108B is a wireless communication device analogous to device 108B as shown in FIG. 2.

Referring still to FIG. 7A, also shown is SM (second module) 2. SM2, in this embodiment, is adapted to be inserted in the direction of the arrow through opening 19 and connected with EC2. SM2, in this embodiment of the present invention, is a compact memory device such as, e.g., a secure digital card (SD), a multimedia card (MMC), or a memory stick.

Further, in FIG. 7A, in one embodiment of the present invention, FM (first module) 1, configured as a compact flash device, is shown to be, in part, comprising the components (device 108B of FIG. 2) of the Bluetooth communication system. Additionally, FIG. 7A also shows SM (second module) 2 as a compact memory device. It should be appreciated that in another embodiment of the present invention, FM1 could be configured as a compact flash device comprising, in part, the compact memory device and SM2 could be comprising the components (108B of FIG. 2) of the Bluetooth communication system. It should further be appreciated that, in this embodiment of the present invention, intermediary device 2001 is of a size smaller than the externally disposed accessible slot of the electronic device, and as such is inserted into the slot.

Figure 7B:
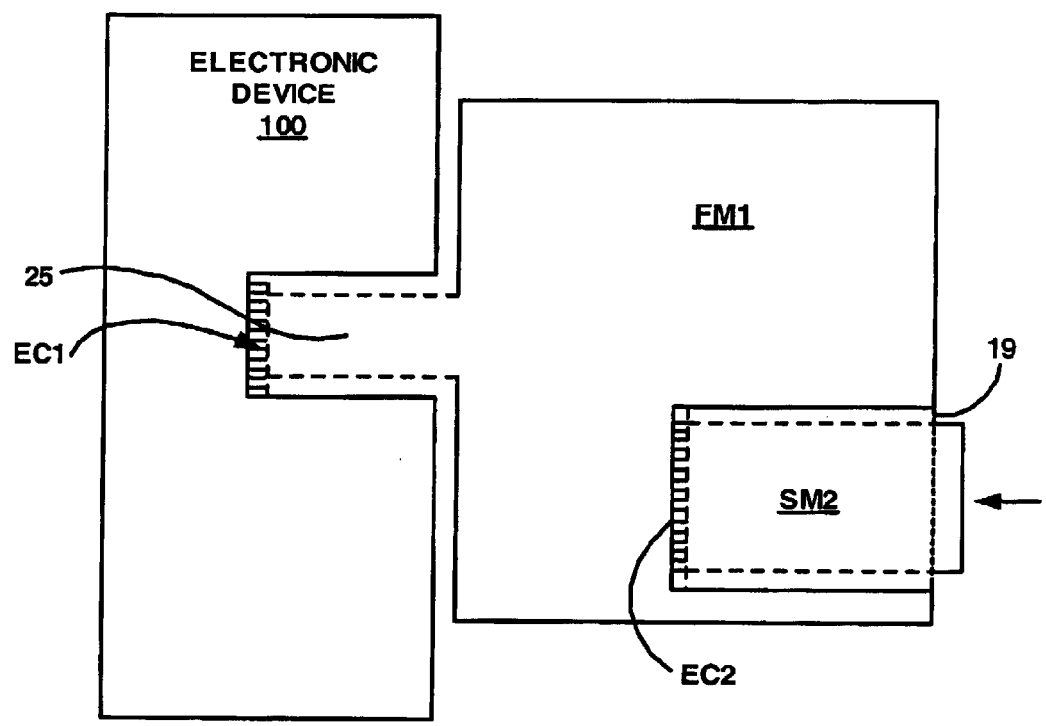
FIG. 7B is a block diagram showing one embodiment of an intermediary apparatus, in accordance with the present invention.

FIG. 7B is a block diagram of intermediary apparatus 2001, functionally analogous to the intermediary apparatus 2001 of FIG. 7A, in another embodiment of the present invention. In this embodiment, FM (first module) 1 is of a size larger than the externally disposed accessible slot of the electronic device. Therefore, EC1, adapted to enable communication between FM1 and electronic device 100 and shown as inserted into the eternally disposed accessible slot of the electronic device, is disposed within a contiguous extended member 25 of FM1. Contiguous extended member 25 is adapted to be inserted in the accessible slot of electronic device 100. Further, because FM1, in this embodiment, is larger in size than the accessible slot of electronic device with which it is to communicate, some of FM1 is disposed external to the electronic device.

It should be appreciated that in the embodiment shown in FIG. 7B, SM2 is disposed toward one side of FM1. The disposition of SM2 as seen in FIG. 7B should not be construed as a limitation as to its location, but should serve as an example of one of the many positions in which SM2 may be located. In another example of the current embodiment, SM2 may be disposed toward the middle. In another example of the current embodiment, SM2 may be disposed toward the side opposite the side depicted in FIG. 7B. In yet another example, SM2 may be disposed on either of the side surfaces. Additionally, FM1 could be configured to receive multiple instances of SM2. For example, there could be a second receiving slot proximal to the disposition of EC2, as shown in FIG. 7B. It should be appreciated that SM2, in another embodiment, may be of a size even larger that FM1, such that it too would extend out from opening 19 into which it is inserted, such that some of SM2 would be disposed external of FM1, analogous to the external disposition of FM1 relative to electronic device 100, as depicted in FIG. 7B.

Exemplary Electronic Device

Figure 7C:
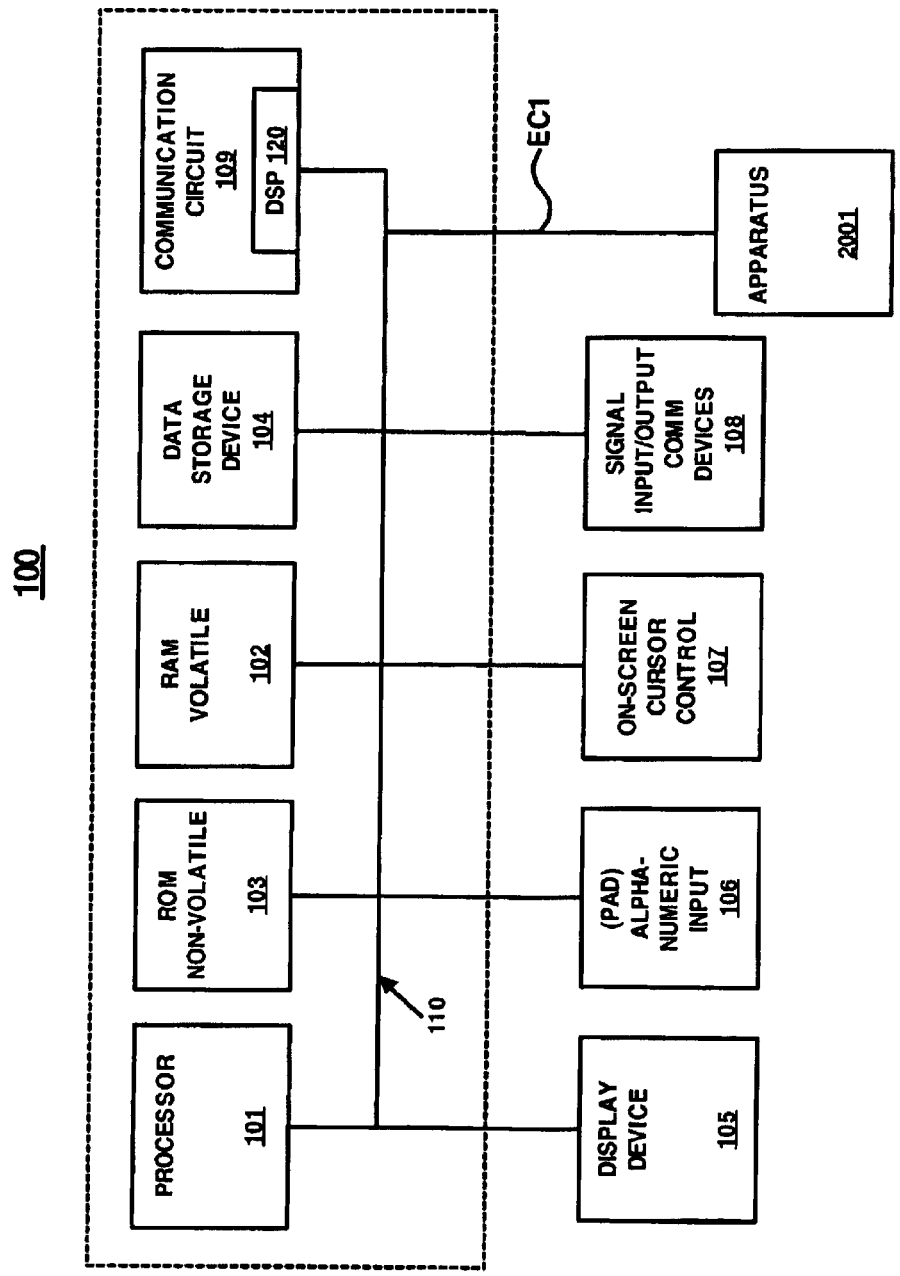
FIG. 7C is a block diagram of one embodiment of an electronic device accordance with the present invention.

As previously recited, the present invention may be implemented in nearly any electronic device. For example, the present invention may be used in PDAs, printers, digital cameras, electronic picture frames, MP3 players, electronic address books, electronic books, and the like. As such, to utilize the present invention, some or all of the components as shown in FIG. 7C may be required. It should be appreciated that, dependent upon the particular electronic device, those components shown in FIG. 7C may or may not be present or required.

FIG. 7C illustrates circuitry of an electronic device 100 which may utilize the present invention. Electronic device 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. As described above, electronic device 100 can also contain a display device 105 coupled to the bus 110 for displaying information to the user of the electronic device.

With reference still to FIG. 7C, electronic device 100 can also include a signal transmitter/receiver device 108, which is coupled to bus 110 for providing a physical communication link between electronic device 100, and a network environment (e.g., network environments 50 and 51 of FIGS. 6A and 6B, respectively). As such, signal transmitter/receiver device 108 enables central processor unit 101 to communicate with other electronic devices and systems coupled to the network. It should be appreciated that within the present embodiment, signal transmitter/receiver device 108 is coupled to an antenna and may provide the functionality to transmit and receive information over a communication interface. It should be further appreciated that the present embodiment of signal transmitter/receiver device 108 is well suited to be implemented in a wide variety of ways. For example, signal transmitter/receiver device 108 could be implemented as a modem.

In one embodiment, electronic device 100, of FIG. 7C, includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in electronic device 100 of FIG. 7C is an optional alphanumeric input device 106 that in one implementation is a handwriting recognition pad ("digitizer"). In another implementation, alphanumeric input device is a keyboard. Alphanumeric input device 106 can communicate information and command selections to processor 101.

Still referring to FIG. 7C, electronic device 100 can also include an optional cursor control or directing device (on-screen cursor control 107) coupled to bus 110 for communicating user input information and command selections to processor 101. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially six adapted cursor directing devices.

In one implementation, on-screen cursor control device 107 may be a touch screen device incorporated with display device 105. On-screen cursor control device 107 is capable of registering a position on display device 105 where the stylus makes contact. In another implementation, on-screen cursor control device 107 may be a touch pad, or, in another implementation, a finger activated push stick. In another implementation, on-screen cursor control device 107 may be a mouse or similar pointing device.

In yet another implementation, on-screen cursor control device 107 is a touch screen device incorporated with display device 105. On-screen cursor control device 107 is capable of registering a position on display device 105 where the stylus makes contact. The display device 105 utilized with electronic device 100 may be a liquid crystal display device, a cathode ray tube (CRT), a field emission display device (also called a flat panel CRT) or other display device suitable for generating graphic images and alphanumeric characters recognizable to the user.

Still with reference to FIG. 7C, intermediary apparatus 2001, the present invention as described in FIGS. 7A and 7B, is shown as coupled with electronic device 100, in one embodiment of the present invention. Intermediary apparatus 2001 is communicatively coupled with electronic device 100 via EC (electrical connector) 1 of FIGS. 7A and 7B.

Figure 8:
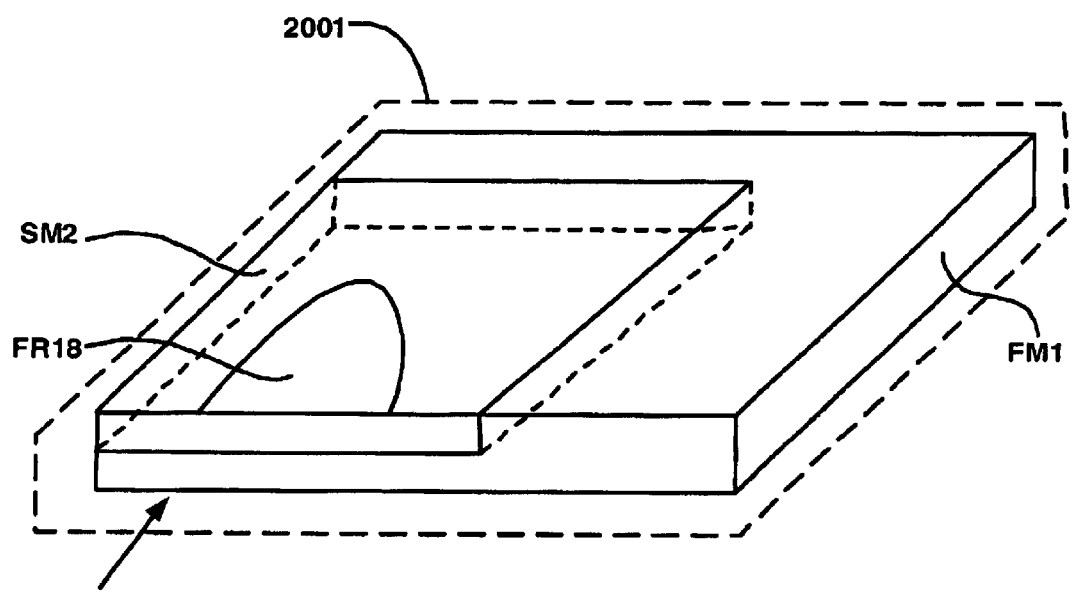
FIG. 8 is an illustrated front top angled view perspective of an intermediary apparatus, in accordance with one embodiment of the present invention.

FIG. 8 shows receiving apparatus 2001 (as indicated by the bordering dotted line) in one embodiment of the present invention=A module 1 is shown as having been inserted, in the direction as indicated by the arrow, into receiving apparatus 2001. In this example, a top insert configuration is depicted, such that the user places their finger in the outlined area, FR (finger recess) 18 and pushes module 1 either into or out of receiving apparatus 2001. It should be appreciated that when module 1 is configured with device 108B of FIG. 2, receiving apparatus 2001 would be configured as the compact memory device. Conversely, when module 1 is configured as the compact memory device, receiving apparatus 2001 would be configured with device 108B of FIG. 2. The receiving apparatus 2001 of FIG. 8, and the related features contained therein, are further described in FIGS. 16A, 16B, etc.

Figure 9:
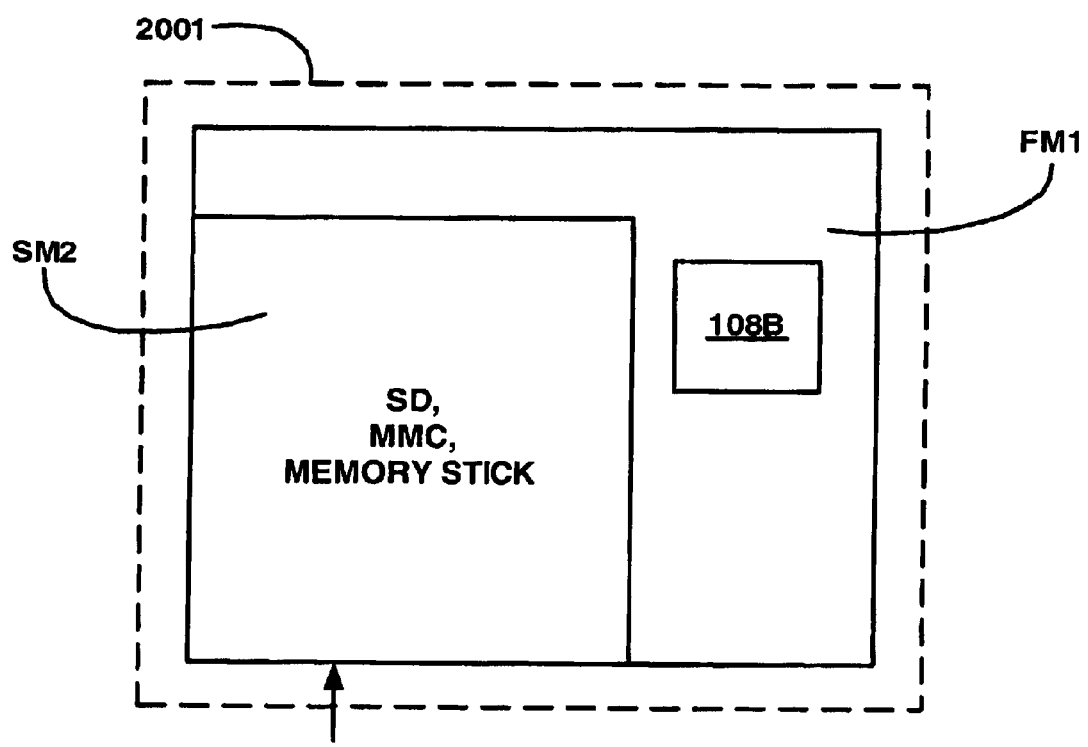
FIG. 9 is an illustrated top view perspective of the intermediary apparatus of FIG. 8 in on embodiment, in accordance with the present invention.

FIG. 9 shows intermediary apparatus 2001 (as indicated by the bordering dotted line) in one embodiment of the present invention. SM2 is shown as having been inserted, in the direction as indicated by the arrow, into FM1. In this embodiment, FM1 is configured as a compact flash device with a coupled device 108B of FIG. 2. Additionally, in the present embodiment, SM2 is configured as the compact memory device, e.g., a SD (secure digital) card, an MMC (multimedia card) or a memory stick.

Figure 10:
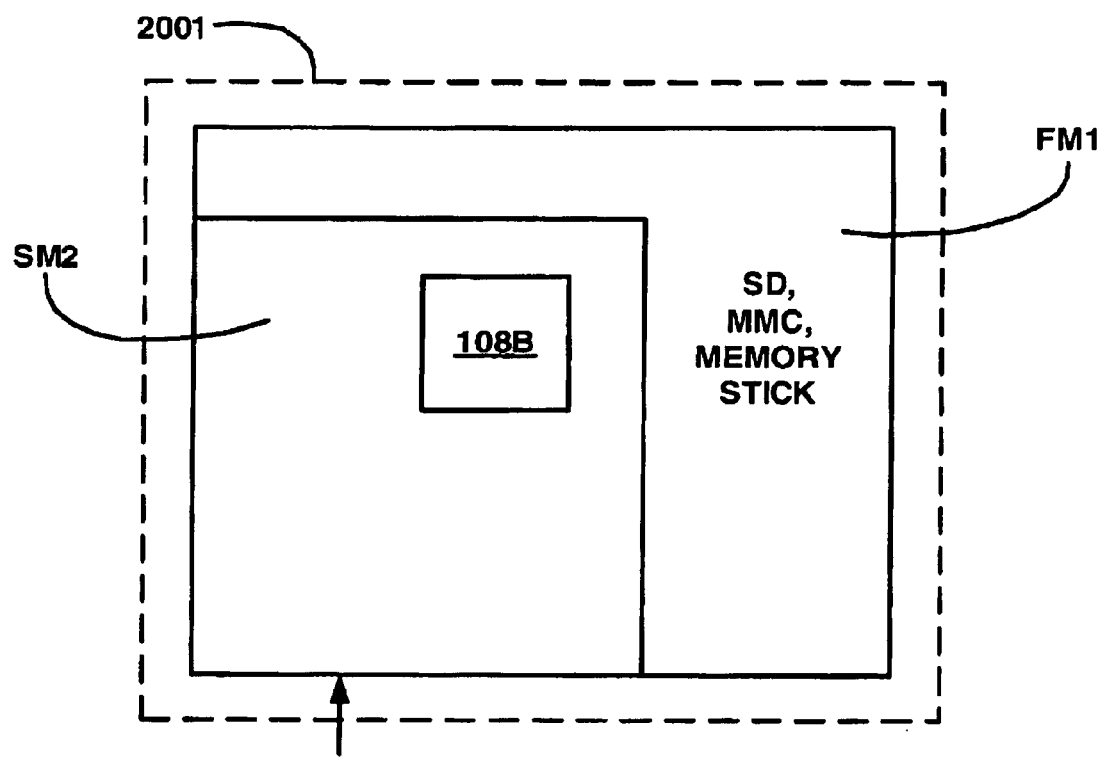
FIG. 10 is an illustrated top view perspective of the intermediary apparatus of FIG. 8 in another embodiment, in accordance with the present invention.

FIG. 10 shows intermediary apparatus 2001 (as indicated by the bordering dotted line) in one embodiment of the present invention. SM2 is shown as having been inserted, in the direction as indicated by the arrow, into FM1. In this embodiment, FM1 is configured as a compact flash device with the compact memory device, e.g., a SD (secure digital) card, an MMC (multimedia card) or a memory stick. Additionally, in the present embodiment, SM2 is configured with device 108B of FIG. 2.

Figure 11:
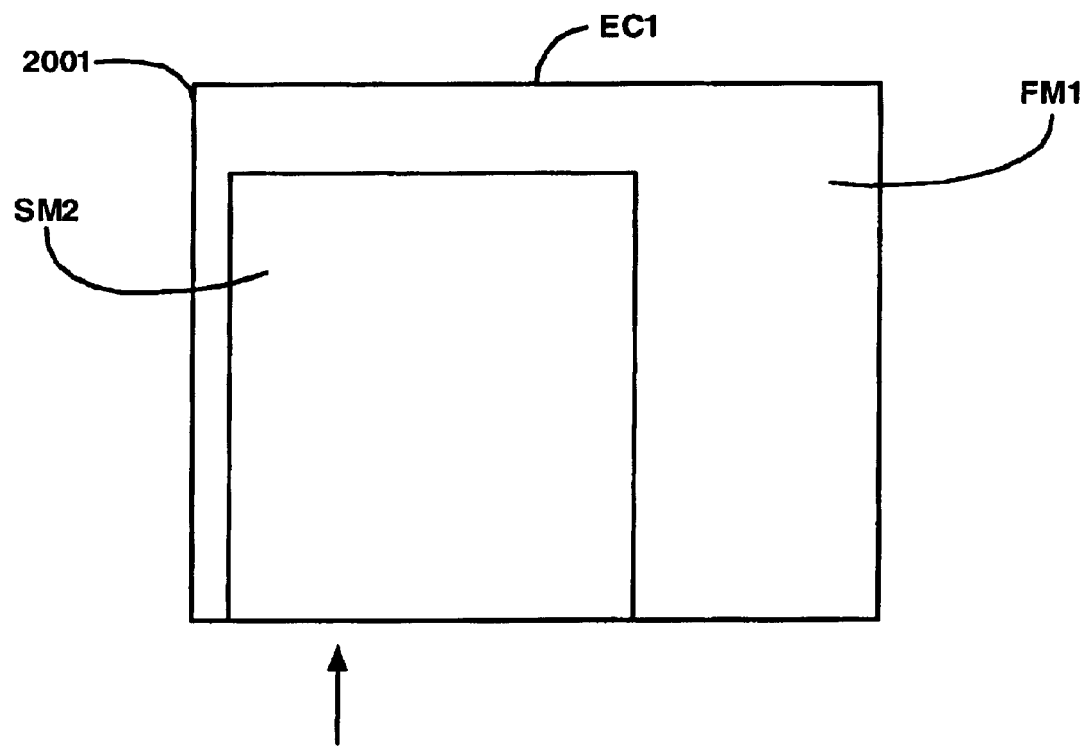
FIG. 11 is an illustrated top view perspective of an intermediary apparatus having a front insertion slot, in accordance with one embodiment of the present invention.

FIG. 11 shows intermediary apparatus 2001 in a front side insertable configuration, in one embodiment of the present invention. SM2 is shown to be insertable into FM1 in the direction as indicated by the arrow. Further, disposed at the top of FIG. 11 is EC (electrical connector) 1, which is analogous to EC1 of FIG. 7. It should be appreciated, in this embodiment, that although FM1 is configured such that SM2 is disposed toward the left side of FM1, FM1 may be configured such that SM2 would be disposed in the middle of or toward the right side of FM1.

Figure 12:
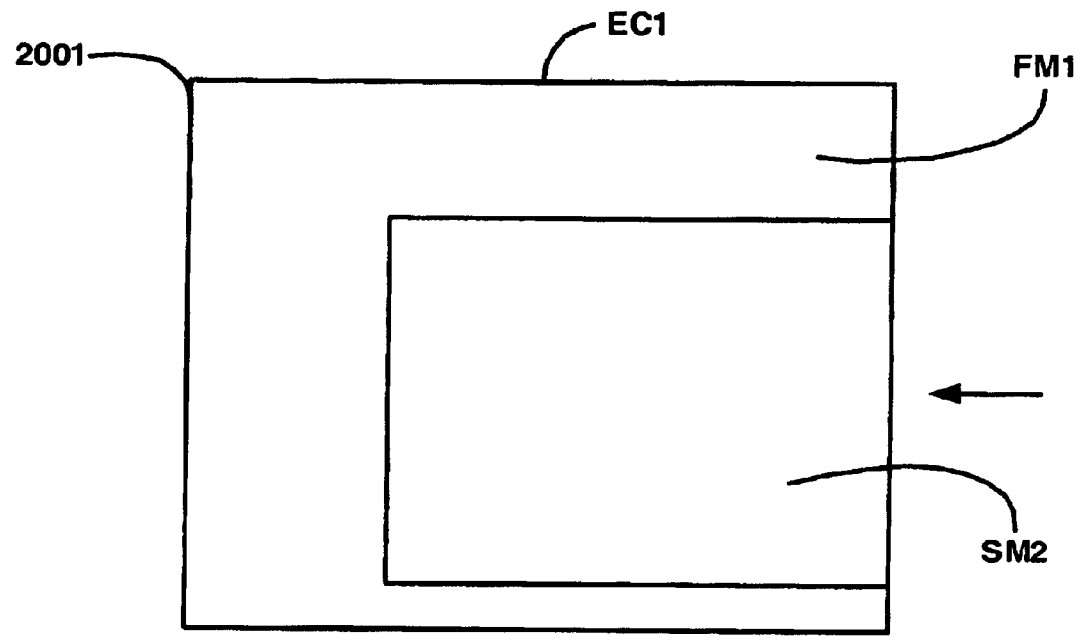
FIG. 12 is an illustrated top view perspective of an intermediary apparatus having a right side insertion slot, in accordance with one embodiment of the present invention.

FIG. 12 shows intermediary apparatus 2001 in a right side insertable configuration, in one embodiment of the present invention. SM2 is shown to be insertable into FM1 in the direction as indicated by the arrow. Further, disposed at the top of FIG. 11 is EC (electrical connector) 1, which is analogous to EC1 of FIG. 7. It should be appreciated, in this embodiment, that although FM1 is configured such that SM2 is disposed toward the middle of the right side of FM1, FM1 may be configured such that SM2 is disposed more toward the top or more toward the bottom of the right side of FM1.

Figure 13:
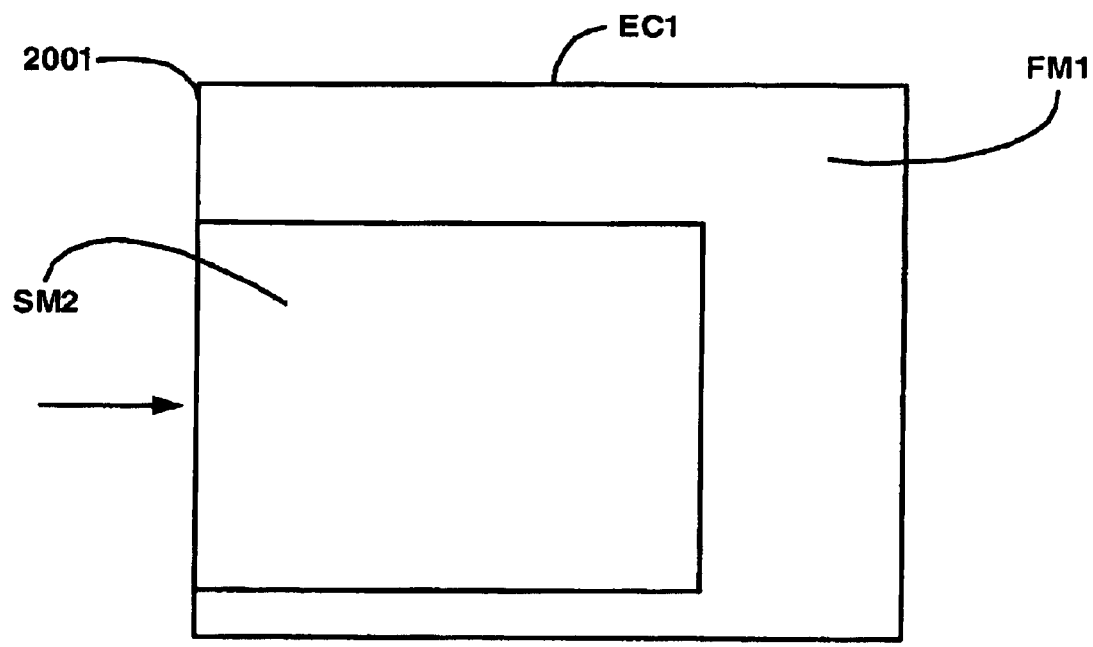
FIG. 13 is an illustrated top view perspective of an intermediary apparatus having a left side insertion slot, in accordance with one embodiment of the present invention.

FIG. 13 shows intermediary apparatus 2001 in a left side insertable configuration, in one embodiment of the present invention. SM2 is shown to be insertable into FM1 in the direction as indicated by the arrow. Further, Disposed at the top of FIG. 11 is EC (electrical connector) 1, which is analogous to EC1 of FIG. 7. It should be appreciated, in this embodiment, that although FM1 is configured such that SM2 is disposed toward the middle of the left side of FM1, FM1 may be configured such that SM2 is disposed more toward the top or more toward the bottom of the left side of FM1.

Figure 14A:
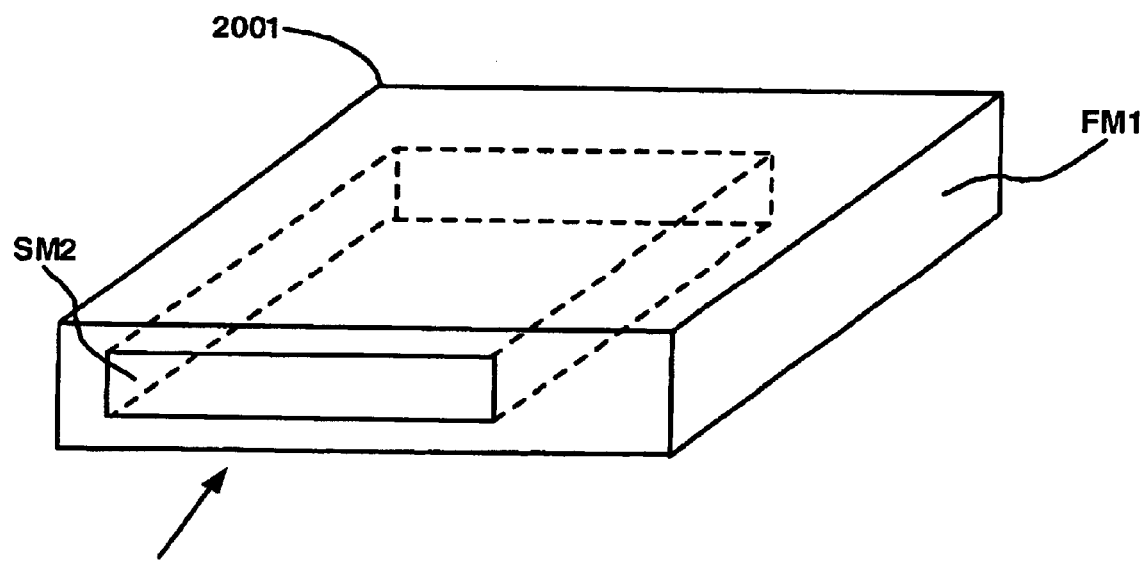
FIG. 14A is an illustrated front angled perspective view of an intermediary apparatus configured with a second module inserted into the first module such that the outer edge of the second module is flush with the outer edge of insertion slot, in accordance with one embodiment of the present invention.

FIG. 14A shows intermediary apparatus 2001 in a front-angle view, in one embodiment of the present invention. In this embodiment, apparatus 2001 is configured such that when SM (second module) 2 is fully inserted, in the direction as indicated by the arrow, into FM (first module) 1, the outermost edge of SM2 is such that it is flush with the surface area proximal to opening 19 (FIG. 7A) of FM1. To remove SM2 from FM1, the user would press SM2 to deinsert.

Figure 14B:
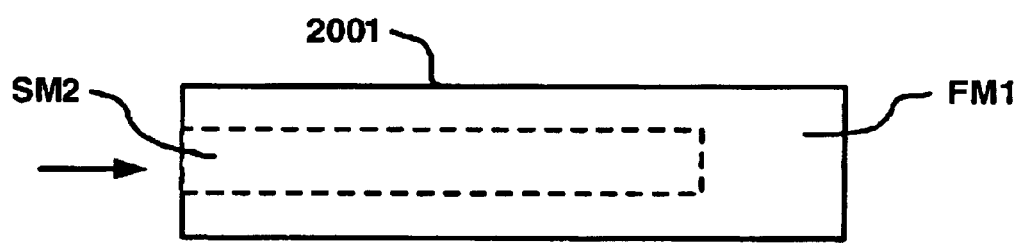
FIG. 14B is an illustrated side view perspective of the intermediary apparatus of FIG. 14A.

FIG. 14B is a side view of the intermediary apparatus of FIG. 14A and shows fully inserted SM2 as flush with the surface area proximal to opening 19 (FIG. 7A) of FM1.

With reference to FIGS. 14A and 14B, it should be appreciated that, in this embodiment of the present invention, by virtue of the configuration of FM1 and SM2, the ejection mechanism that would have been disposed within the electronic device may now be disposed within FM1. Therefore, the manufacturer of the electronic device is enabled to utilize the vacated real estate, such that the electronic device may include additional or improved functionalities, thereby improving user interoperability.

Figure 15A:
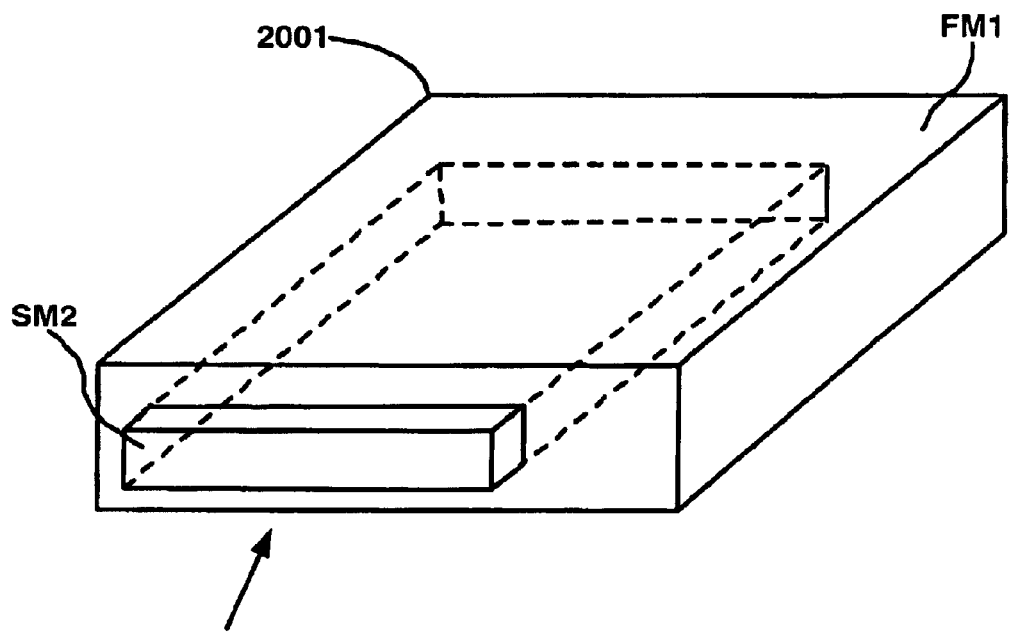
FIG. 15A is an illustrated front angled perspective view of an intermediary apparatus configured with a second module inserted into the first module such that the outer edge of the second module is protruding from the outer edge of insertion slot, in accordance with one embodiment of the present invention.

FIG. 15A shows intermediary apparatus 2001 in a front-angle view, in one embodiment of the present invention. In this embodiment, apparatus 2001 is configured such that when SM (second module) 2 is fully inserted, in the direction as indicated by the arrow, into FM (first module) 1, the outermost edge of SM2 is such that it protrudes from opening 19 (FIG. 7A) of FM1. To remove SM2 from FM1, the user would grasp SM2 and pull to deinsert.

Figure 15B:
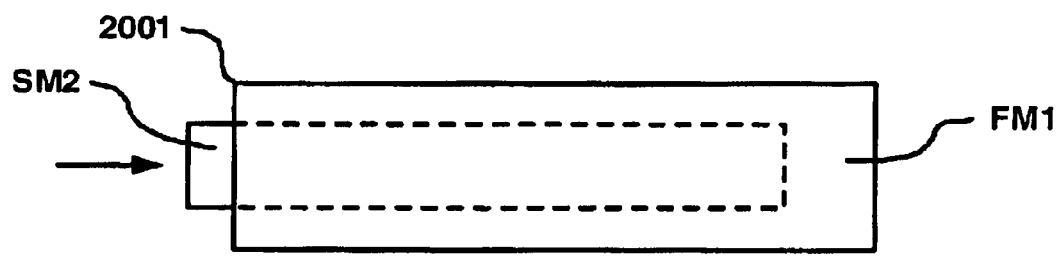
FIG. 15B is an illustrated side view perspective of the intermediary apparatus of FIG. 15A.

FIG. 15B is a side view of the intermediary apparatus of FIG. 15A and shows fully inserted SM2 as protruding from opening 19 (FIG. 7A) of FM1.

With reference to FIGS. 15A and 15B, it should be appreciated that, in this embodiment of the present invention, by virtue of the configuration of FM1 and SM2, the ejection mechanism that would have been disposed within the electronic device may now be removed. Further, because SM2 is disposed such that it is readily and easily removable, an edged object such as, e.g., a knife edge or a user's fingernail is not necessary to attempt to pick or hook part of SM2 in order to remove SM2 from FM1, and, as such, an ejection mechanism disposed within FM1 is unnecessary. Therefore, the manufacturer of the electronic device is enabled to utilize the vacated real estate, such that the electronic device may include additional or improved functionalities, thereby improving user interoperability.

Figure 16A:
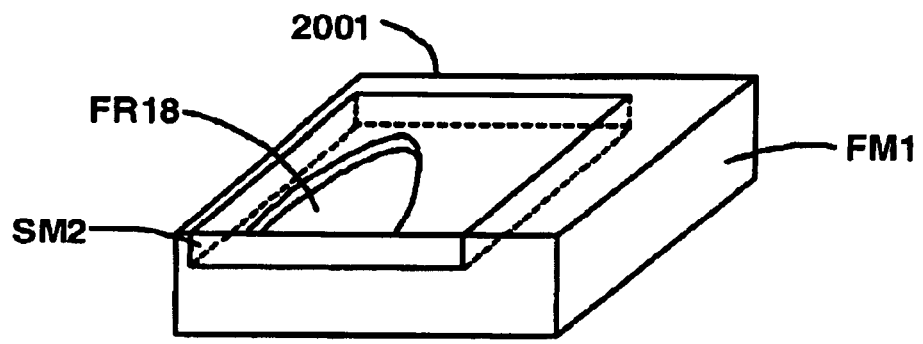
FIG. 16A is an illustrated front angled perspective view of an intermediary apparatus configured with a second module inserted into the first module showing the finger opening which allows the user to press and push out the inserted second module, in accordance with one embodiment of the present invention.

FIG. 16A shows intermediary apparatus 2001 in a front-angle view, in one embodiment of the present invention. In this embodiment, apparatus 2001 is configured as top insertable. As such, SM2 has FR (finger recess) 19 which is analogous to FR (finger recess) of FIG. 8. When SM (second module) 2 is fully inserted into FM (first module) 1, to deinsert SM2, the user would place their finger into finger recess 19 and press and push SM2 out of FM1.

Figure 16B:
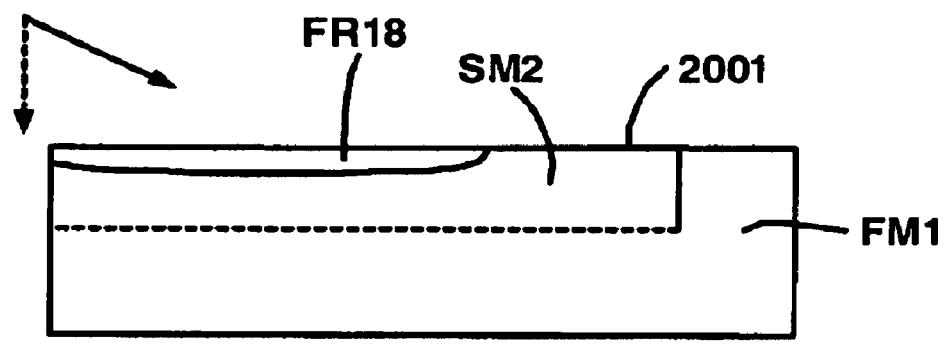
FIG. 16B is an illustrated side view perspective of the intermediary apparatus of FIG. 16A.

FIG. 16B is a side view of the intermediary apparatus of FIG. 16A Configured as top insertable, SM2 is inserted into FM1 in an almost two step process as indicated by the arrows. Initiating the insertion is represented by the solid arrow, in a forward angled motion, while also pressing downward as indicated by the dashed arrow. FR (finger recess) 19 is shown and is adapted to provide positive user control of SM2 during insertion and removal.

With reference to FIGS. 16A and 16B, it should be appreciated that in the present embodiment, by configuring FM1 with a top insertable functionality, inserting and removing SM2 into or out of FM1 is a simple and seamless process, thereby improving user interoperability. Additionally, by virtue of the ease of which SM2 may be inserted into FM1, the possibility of damage to either the electronic device or the compact memory device is reduced.

Figure 17A:
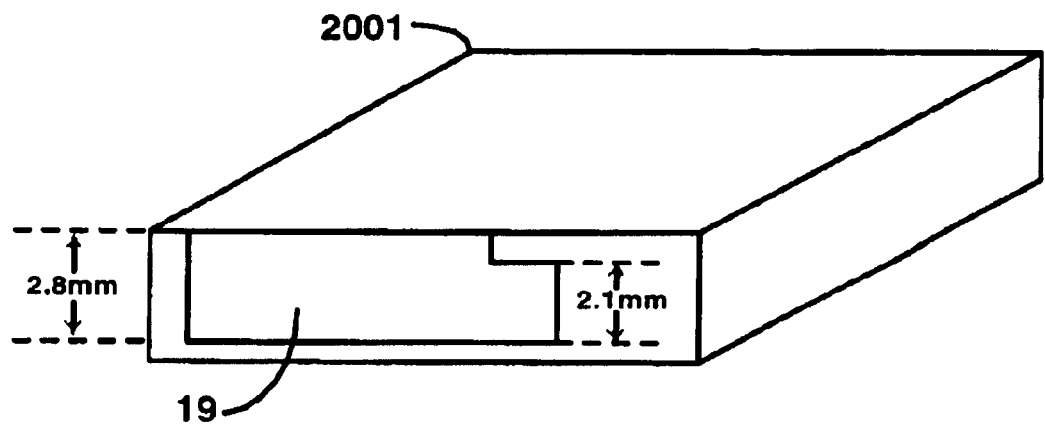
FIG. 17A is a front angled perspective view of a compact flash device configured with a universal opening, in accordance with one embodiment of the present invention.

FIG. 17A is a front angled view of FM1 of intermediary apparatus 2001, in one embodiment of the present invention. In this embodiment, FM1 of intermediary apparatus 2001 is configured as a compact flash device and adapted with an opening 19. Opening 19, in this embodiment of the present invention, is configured such that it may accept different sized compact memory devices such as e.g., a SD (secure digital) card or an MMC (multimedia card) or a memory stick. It should be appreciated that opening 19 may be disposed in the compact flash devices of FIGS. 17b, 17C, and 17D, respectively. It should be appreciated that by configuring FM1 such that it is enabled to receive and communicate with different compact memory devices, without regard to size, shape, storage capacity, or connecting pin configurations, a user is provided with an apparatus that enables functional interoperability and communication with nearly any compact memory device.

Figure 17B:
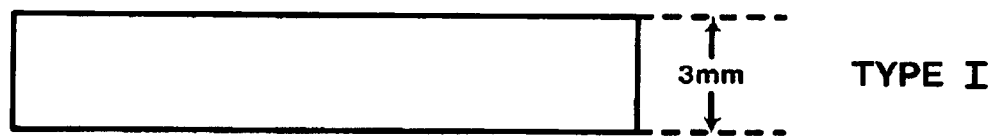
FIG. 17B is a side view of a Type I compact flash device.

FIG. 17B is a side view perspective of a Type I compact flash device, in one embodiment of the present invention. It should be appreciated that, in one embodiment, the present invention may be integrated within the compact flash device, disposed as shown in FIG. 17A.

Figure 17C:
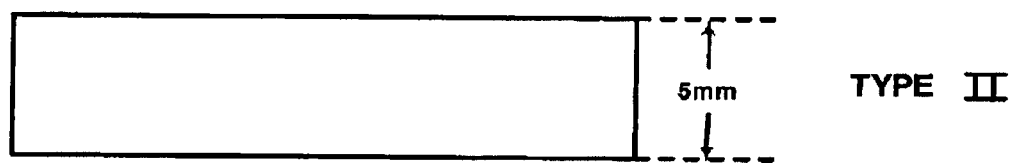
FIG. 17C is a side view of a Type II compact flash device.
Figure 17D:
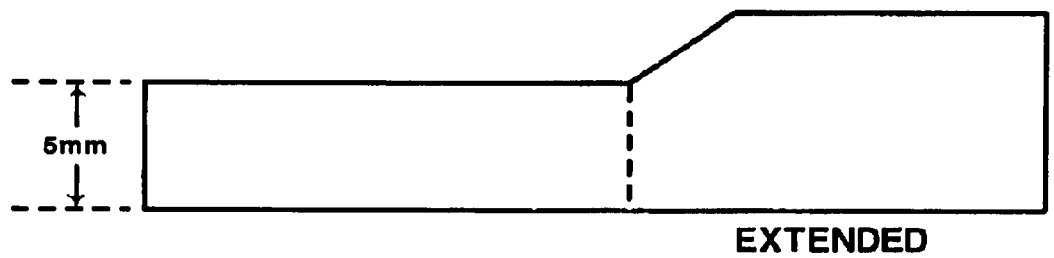
FIG. 17D is a side view of an extended type compact flash device.

FIG. 17C is a side view perspective of a Type II compact flash device, in one embodiment of the present invention. It should be appreciated that, in one embodiment, the present invention may be integrated within the compact flash device, disposed as shown in FIG. 17A FIG. 17D is a side view perspective of an extended compact flash device, in one embodiment of the present invention. The extended compact flash device of FIG. 17D, in one implementation, is configured such that it contains the components and circuitry for an operational wireless modem and the associated antenna. It should be appreciated that, in one embodiment, the present invention may be integrated within the compact flash device, disposed as shown in FIG. 17A.

Because the height of compact flash type II of Figure and the extended type is more than double the height of some of the compact memory devices, it should be appreciated that it is conceivable that more than one compact memory device could be implemented in the compact flash devices. It should further be appreciated that by incorporating the present invention into the compact flash device, improved user interoperability is provided in a simple and seamless manner.

Figure 17E:
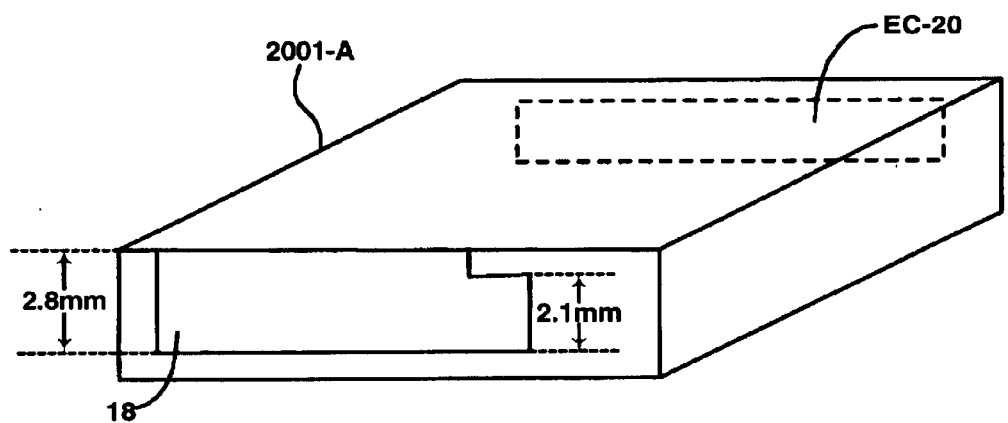
FIG. 17E is an illustrated front angled view of a coupling adapter apparatus, in accordance with one embodiment of the present invention.

FIG. 17E is an illustrated front angled view of coupling adapter apparatus 2001-A, another embodiment of the present invention. In this embodiment, coupling adapter apparatus 2001-A is adapted to be inserted into the accessible slot of electronic device 100. Opening 18 is adapted to receive a first module and is analogous to opening 19 of FIG. 17A. As such, in this embodiment of the present invention, opening 18 is configured such that it may as accept different sized compact memory devices such as e.g., a SD (secure digital) card or an MMC (multimedia card) or a memory stick or a compact flash card.

Figure 17F:
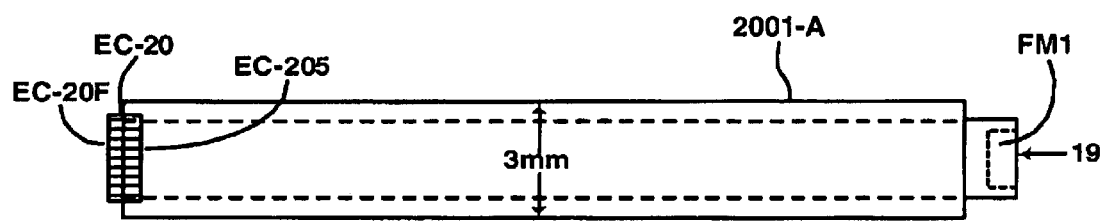
FIG. 17F is an illustrated left side view of the coupling adapter apparatus of FIG. 17E, in accordance with one embodiment of the present invention.
Figure 17G:
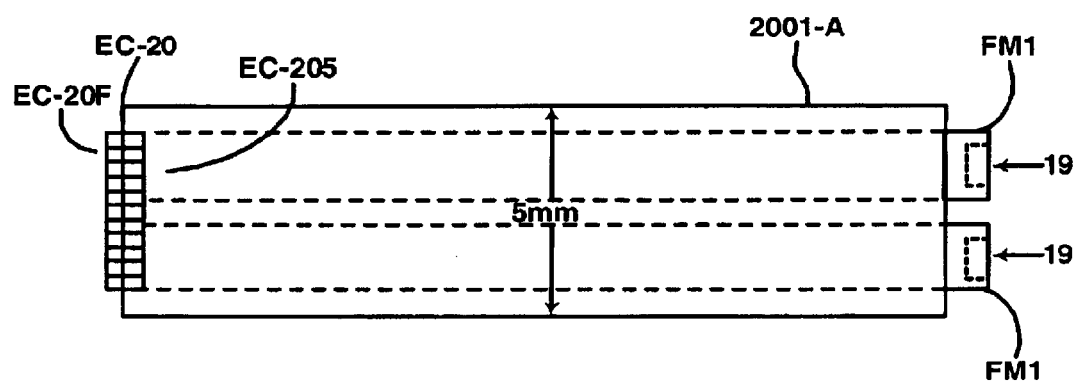
FIG. 17G is an illustrated left side view of the coupling adapter apparatus of FIG. 17E, in accordance with one embodiment of the present invention.

Still referring to FIG. 17E, disposed within coupling adapter apparatus 2001-A, is electrical connector EC-20. EC-20 is comprised of a first connector portion EC-20-F and a second connector portion EC-20-S, both of which are shown in FIGS. 17F and 17G. First connector portion EC-20-F is adapted to enable communication between coupling adapter apparatus 2001-A and electronic device 100, provided coupling adapter apparatus 2001-A is inserted into the accessible slot of electronic device 100. Second connector portion EC-20-S is adapted to enable communication between coupling adapter apparatus 2001-A and the first module, provided the first module is inserted into opening 18 of coupling adapter apparatus 2001-A.

FIG. 17F is an illustrated left side view of coupling adapter apparatus 2001-A, in one embodiment of the present invention. EC-20 is on the left, and depicts the orientation of EC-20F and EC-20-S relative to coupling adapter apparatus 2001-A, in one embodiment of the present invention. FM1 is shown as inserted into coupling adapter apparatus 2001-A through opening 19. FM1 is analogous to FM1 of FIG. 7A. In the present embodiment, FM1 might be a compact memory device such as a secure digital card (SD), a multimedia card (MMC), a memory stick, or a compact flash card. It should be appreciated that in another embodiment of the present invention, FM1 may or may not have an opening 19 analogous to opening 19 of FIGS. 7A and 7B. It should be fisher appreciated that FM1, in another embodiment, could be a communication device, such as a wireless modem. It should also be appreciated that, in this embodiment, the height of coupling adapter apparatus 2001-A is equivalent to a Type I compact flash card.

FIG. 17G is an illustrated left side view of coupling adapter apparatus 2001-A, in one embodiment of the present invention. EC-20 is on the left and depicts the orientation of EC-20-F and EC-203 relative to coupling adapter apparatus 2001-A, in one embodiment of the present invention. It should be appreciated that in this embodiment, the height of coupling adapted apparatus 2001-A is equivalent to the height of a Type II compact flash card. As such, because the height is approximately five millimeters, in another embodiment, more than one FM1 could be inserted into coupling adapter apparatus 2001-A, as is thusly shown with the presence of two FM1s. It should be appreciated that the FM18 of FIG. 17F may or may not be configured to receive a second module.

It should be appreciated that, in another embodiment of the present invention, coupling adapter apparatus 2001-A could be configured with a visual indicator, which would indicate to a user that proper connection between the coupling adapter apparatus and the electronic device into which it is inserted is established, such that communication between the two is enabled.

Figure 18A:
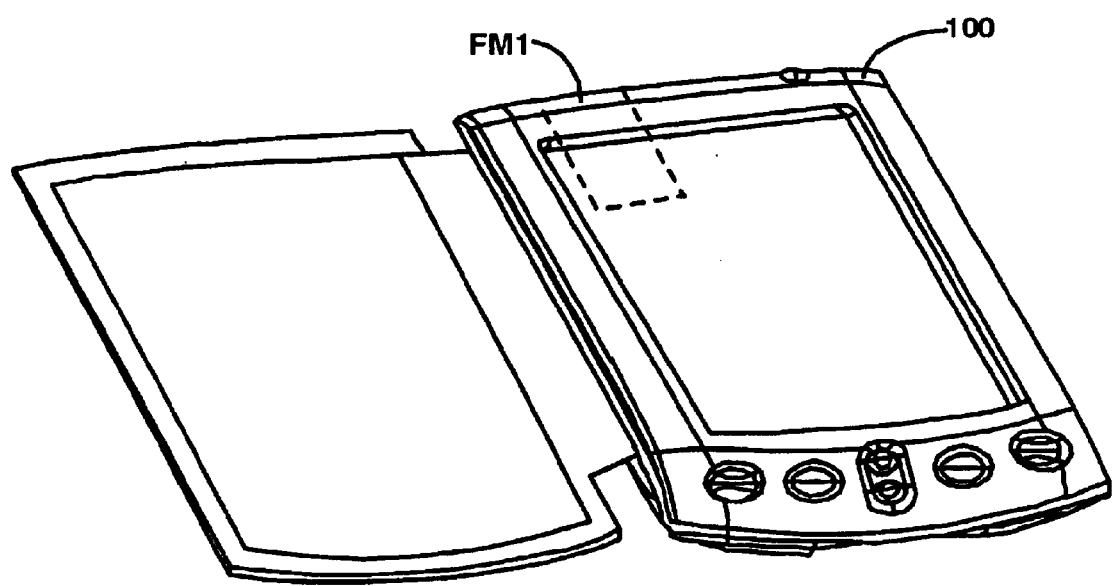
FIG. 18A is an illustrated front angled perspective view of a portable computer system configured with an intermediary apparatus, in accordance with one embodiment of the present invention.

FIG. 18A is a front angled perspective view of a palmtop computer 100 configured with an externally disposed accessible slot, in one implementation the present invention. In the present example, the accessible slot is disposed on the top surface area of portable computer 100. Additionally, FM1 is shown as inserted into the accessible slot.

Figure 18B:
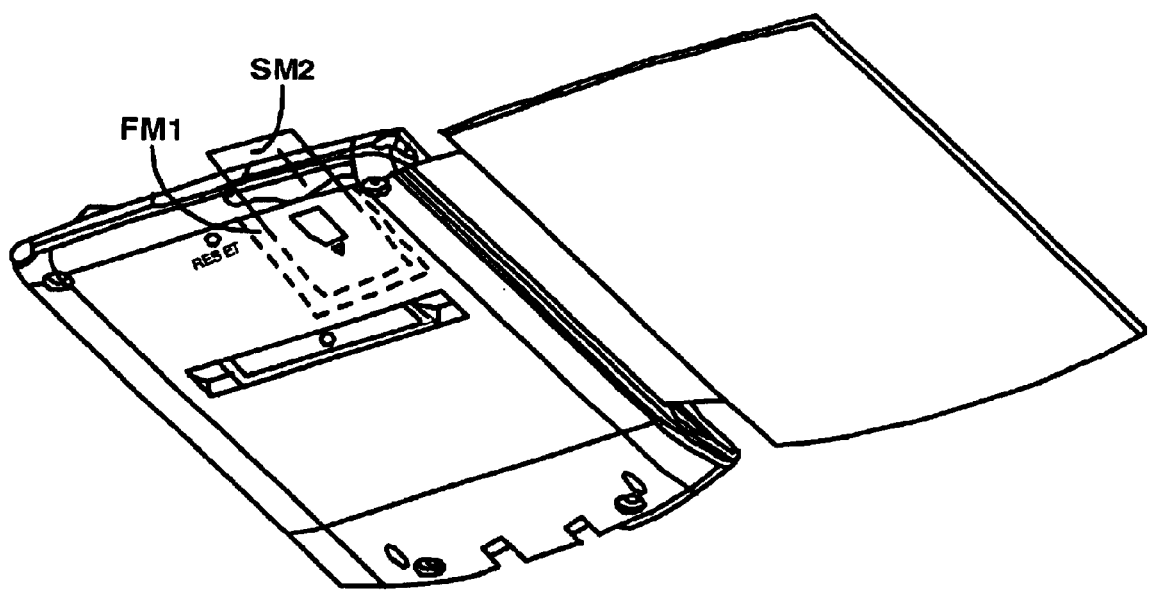
FIG. 18B is an illustrated rear angled perspective of the portable computer system of FIG. 18A.

FIG. 18B is a rear angled perspective view of the palmtop computer of FIG. 18A In this example, SM2 is shown as inserted into FM1. It should be appreciated that FM1 and SM2 are analogous to FM1 and SM2 of FIG. 7A and FIG. 7B.

With reference to FIGS. 18A and 18B, in one example of the present invention, a user may wish to wirelessly transmit those files, saved and stored within a compact memory device, to another electronic device such as, e.g., a printer for printing or to a computer system for displaying or storing those files or to another portable computer system. The present invention, with communication functionality and compact memory device interaction enabled, provides improved features and enhanced functionality while using the provided accessible slot, in a simple and seamless manner, such that improved user interoperability is achieved.

Figure 19:
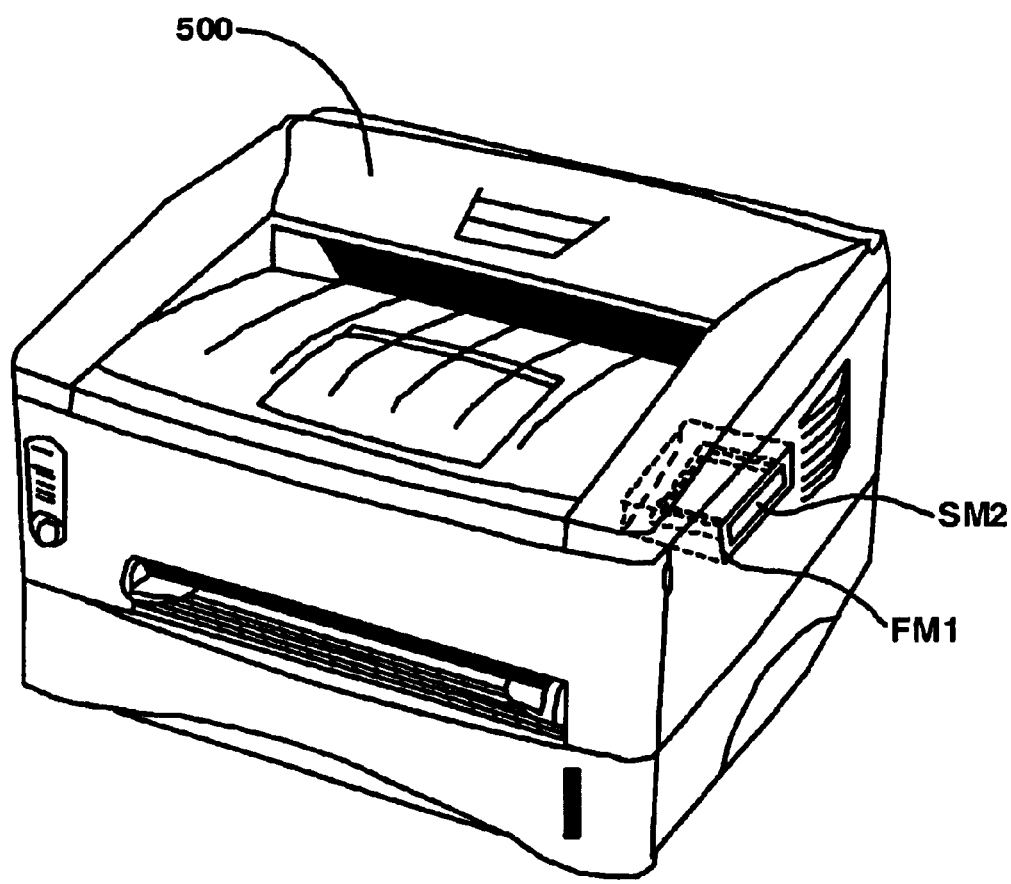
FIG. 19 is an illustrated front angled perspective view of a printer configured with an intermediary apparatus, in accordance with one embodiment of the present invention.

FIG. 19 is a front angled perspective view of a printer 500 configured with an externally disposed accessible slot, in one implementation of the present invention. In the present example, the slot is disposed on the right side of printer 500. Additionally, SM2 is shown as inserted into FM1. It should be appreciated that while FIG. 19 depicts the present invention disposed on the right side of printer 500, the present invention may be disposed practically anywhere on the printer. Further, while printer 500 depicted in FIG. 19 is shown as a laser printer, the present invention may be implemented with nearly any type of printer such as, e.g., an inkjet printer, a multifunction printer (fax/copier/printer combination), a dot matrix printer, and the like. SM2 and FM1 are analogous to SM2 and FM1 of FIGS. 7A and 7B. In one example of the present invention, a user may wish to wirelessly transmit those files, saved and stored within a compact memory device, to another electronic device such as, a computer system for storage or to a portable computer. The present invention, with communication functionality and compact memory device interaction enabled, provides improved features and enhanced functionality while using the provided accessible slot, in a simple and seamless manner, such that improved user interoperability is achieved.

Figure 20:
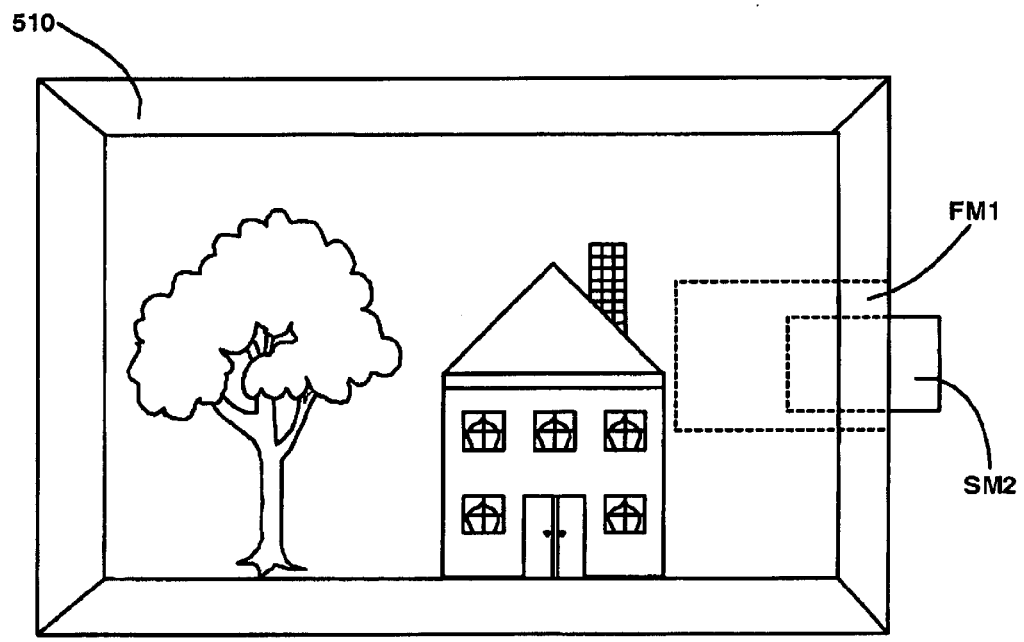
FIG. 20 is an illustrated front view perspective of a digital picture frame configured with an intermediary apparatus, in accordance with one embodiment of the present invention.

FIG. 20 is a front facing perspective view of an electronic picture frame 510 configured with an externally disposed accessible slot, in one implementation of the present invention. In the present example, the accessible slot is disposed on the right side of electronic picture frame 510, but it should be appreciated that the slot may be disposed nearly anywhere upon electronic picture frame 510. Further, SM2 is shown as inserted into FM1. SM2 and FM1 of FIG. 20 are analogous to SM2 and FM1 of FIGS. 7A and 7B. In one example of the present invention, a user may wish to wirelessly transmit photos or other graphic files, saved and stored within a compact memory device, to another electronic device. The present invention, with communication functionality and compact memory device interaction enabled, provides improved features and enhanced functionality while using the provided accessible slot, in a simple and seamless manner, such that improved user interoperability is achieved.

Figure 21:
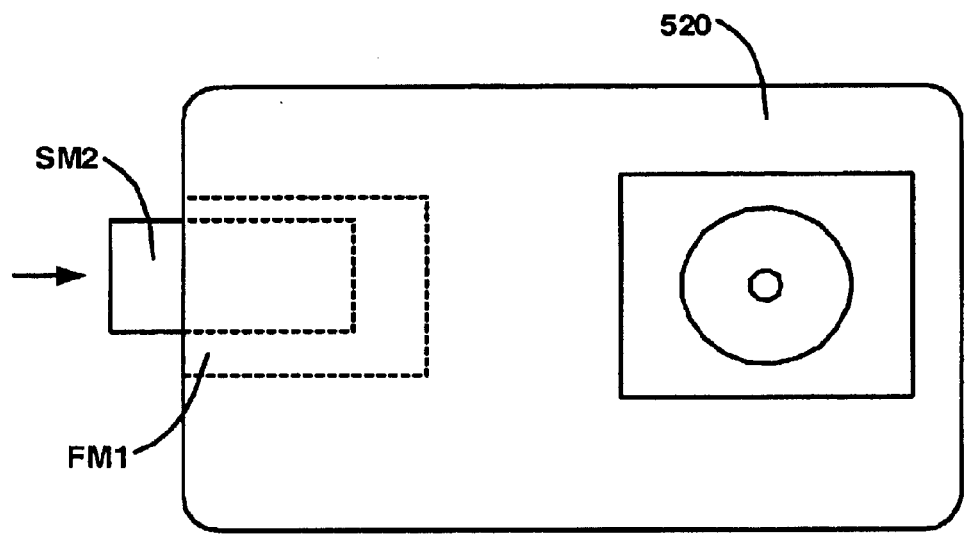
FIG. 21 is an illustrated front view perspective of a digital camera configured with an intermediary apparatus, in accordance with one embodiment of the present invention.

FIG. 21 is a front facing perspective of a digital camera 520 configured with an externally disposed accessible slot, in one implementation of the present invention. In the present example, the accessible slot is disposed on the right side of digital camera 520 but it should be appreciated that the accessible slot may be disposed in nearly any location within digital camera 520. Further, SM2 is shown as inserted into FM1. SM2 and FM1 of FIG. 21 are analogous to SM2 and FM1 of FIG. 7A and FIG. 7B. In one example of the present invention, a user may wish to wirelessly transmit photographic files, saved and stored within a compact memory device, to other electronic devices such as, e.g., a printer so that the photographs may be printed or to a computer system so the photographs may be displayed or edited. The present invention, with communication functionality and compact memory device interaction enabled, provides these improved features and enhanced functionality while using the provided accessible slot, in a simple and seamless manner, such that improved user interoperability is achieved.

Figure 22:
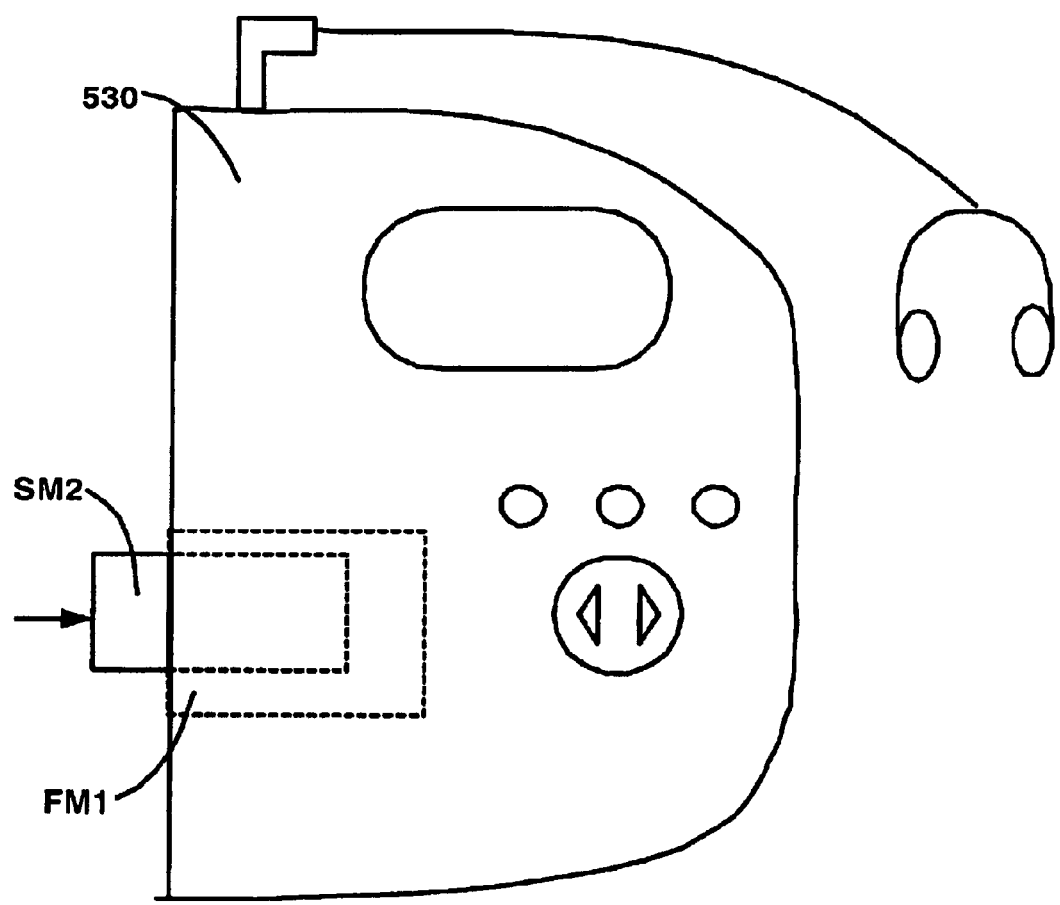
FIG. 22 is an illustrated front view perspective of an MP3 player configured with an intermediary apparatus, in accordance with one embodiment of the present invention.

FIG. 22 is front facing perspective view of an MP3 player 530 configured with an externally disposed accessible slot, in one implementation of the present invention. In the present example, the accessible slot is disposed on the left side of MP3 player 530, but it should be appreciated that the accessible slot may be disposed nearly anywhere upon MP3 player 530. Further, SM2 is shown as s inserted-into FM1. SM2 and FM1 of FIG. 21 are analogous to SM2 and FM1 of FIG. 7A and FIG. 7B. In one example of the present invention, a user may wish to wirelessly transmit MP3 files, saved and stored within a compact memory device, to another electronic device such as, e.g., another MP3 player or to a computer system. The present invention, with communication functionality and compact memory device interaction enabled, provides improved features and enhanced functionality while using the provided accessible slot, in a simple and seamless manner, such that improved user interoperability is achieved.

With reference to FIGS. 18–22, these implementations of the present invention are representative of the present invention as shown in FIG. 7A. It should be appreciated that the present invention as shown in FIG. 7B may be just as readily and easily implemented, such as when the externally disposed accessible slot of the electronic device is smaller in size that the first module of the present invention.

By providing multiple embodiments of the present invention, the present invention may be utilized by nearly any electronic device.

The present invention provides an apparatus and method for providing improved features and enhanced functionality to nearly any electronic device.

The present invention further provides an apparatus and method which achieves the above listed accomplishment and which provides advanced user interoperability by incorporating compact memory devices and compact wireless communication devices into a single accessible slot. The present invention further provides an apparatus and method which achieves the above listed accomplishments in an simple and seamless manner to the user of the electronic device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of-the invention be defined by the Claims appended hereto and their equivalents.

What is claimed is:

1. An intermediary apparatus adapted to be communicatively coupled with an electronic device, said electronic device having an externally disposed accessible slot, said intermediary apparatus comprising:

a first module having an opening, said first module adapted to be communicatively coupled with said electronic device, said first module adapted to receive a second module, said first module comprising a wireless communication device that is operable to provide said electronic device with wireless communications functionality independent of said second module;

a controller coupled with said first module, said controller for controlling communication between said first module and said second module, provided said second module is inserted into said first module, said second module comprising a compact memory device;

a first electrical connector coupled with said first module, said first electrical connector adapted to enable communication between said first module and said electronic device; and a second electrical connector coupled with said first module, said second electrical connector adapted to enable communication between said first module and said second module, provided said second module is inserted into said first module.

2. The intermediary apparatus of claim 1 wherein said first module is adapted to be inserted into said accessible slot of said electronic device.

3. The intermediary apparatus of claim 1 wherein said opening of said first module is adapted to receive said second module.

4. The intermediary apparatus of claim 1 wherein said first module comprises a second compact memory device and said second module comprises a communication device.

5. The intermediary apparatus of claim 1 wherein said wireless communication device is a Bluetooth wireless device.

6. The intermediary apparatus of claim 1 wherein said wireless communication device is a modem.

7. The intermediary apparatus of claim 1 wherein said opening of said first module has a size that is larger than said externally disposed accessible slot of said electronic device such that said first module enables said second module, said second module having a size which is larger than said externally disposed accessible slot of said electronic device, to be communicatively coupled with said electronic device.

8. A system having an electronic device and an intermediary apparatus, said electronic device having an externally disposed accessible slot, said intermediary apparatus communicatively coupled with said electronic device, said intermediary apparatus comprising:

a first module having an opening, said first module adapted to receive a second module, said first module comprising a wireless communication device that is operable to provide said electronic device with wireless communications functionality independent of said second module;

a controller coupled with said first module, said controller for controlling the communication between said first module and said second module, provided said second module is inserted into said first module, said second module a compact memory device;

a first electrical connector coupled with said first module, said first electrical connector adapted to enable communication between said first module and said electronic device; and a second electrical connector coupled with said first module, said second electrical connector adapted to enable communication between said first module and said second module, provided said second module is inserted into said first module.

9. The system of claim 8 wherein said first module is adapted to be inserted into said accessible slot of said electronic device.

10. The system of claim 8 wherein said opening of said first module is adapted to receive said second module.

11. The system of claim 8 wherein said first module comprises a second compact memory device and said second module comprises a communication device.

12. The system of claim 8 wherein said compact memory device is a SD (secure digital) card.

13. The system of claim 8 wherein said compact memory device is an MMC (multimedia card).

14. The system of claim 8 wherein said wireless communication device is a Bluetooth wireless device.

15. The system of claim 8 wherein said wireless communication device is a wireless modem.

16. The system of claim 8 wherein said opening of said first module has a size that is larger than said externally disposed accessible slot of said electronic device such that said first module enables said second module, said second module having a size which is larger than said externally disposed accessible slot of said electronic device, to be communicatively coupled with said electronic device.

17. In a system having an electronic device, wherein said electronic device having an externally disposed accessible slot, and an intermediary apparatus adapted to be communicatively coupled with said electronic device, a method for improved user interoperability comprising the steps of:

providing a first module comprising a opening, said opening adapted to receive a second module, said first module adapted to be inserted into said accessible slot of said electronic device, said first module comprising a wireless communication device that is operable to provide said electronic device with wireless communications functionality independent of said second module;

providing a first electrical connector adapted to enable communication between said first module and said electronic device;

providing a second electrical connector adapted to enable communication between said first module and said second module, provided said second module is inserted into said first module, said second module a memory device;

providing a controller coupled with said first module, said controller adapted to control communication between said first module and said second module, provided said second module is inserted into said first module;

inserting said first module into said electronic device; and inserting said second module into said first module.

18. The method as recited in claim 17 wherein said first module is adapted to be inserted into said accessible slot of said electronic device.

19. The method as recited in claim 17 wherein said first module comprises a memory device and said second module comprises a communication device.

* * * * *